(12) United States Patent
Thakkar

(10) Patent No.: US 11,675,566 B2
(45) Date of Patent: Jun. 13, 2023

(54) RENDERING VISUAL COMPONENTS ON APPLICATIONS IN RESPONSE TO VOICE COMMANDS

(71) Applicant: GOOGLE LLC, Mountain View, CA (US)

(72) Inventor: Anuj Thakkar, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/837,896

(22) Filed: Jun. 10, 2022

(65) Prior Publication Data

US 2022/0308830 A1     Sep. 29, 2022

Related U.S. Application Data

(63) Continuation of application No. 16/466,254, filed as application No. PCT/US2019/030930 on May 6, 2019, now Pat. No. 11,360,738.

(51) Int. Cl.
| | |
|---|---|
| *G10L 15/22* | (2006.01) |
| *G06F 3/16* | (2006.01) |
| *G06F 9/451* | (2018.01) |
| *G10L 15/18* | (2013.01) |

(52) U.S. Cl.
CPC .............. *G06F 3/167* (2013.01); *G06F 9/451* (2018.02); *G10L 15/1822* (2013.01); *G10L 15/22* (2013.01)

(58) Field of Classification Search
None
See application file for complete search history.

(56) References Cited

U.S. PATENT DOCUMENTS

| | | |
|---|---|---|
| 2014/0214967 A1 | 7/2014 | Baba et al. |
| 2016/0203002 A1 | 7/2016 | Kannan et al. |
| 2017/0006329 A1 | 1/2017 | Jang et al. |
| 2017/0116990 A1 | 4/2017 | Faaborg et al. |
| 2019/0362718 A1 | 11/2019 | Bhargava et al. |
| 2021/0334067 A1 | 10/2021 | Thakkar |

FOREIGN PATENT DOCUMENTS

| | | |
|---|---|---|
| WO | 2020226619 | 11/2020 |

OTHER PUBLICATIONS

European Patent Office: Examination Report issued for Application No. 19729113.1; 10 pages; dated Oct. 27, 2021.
Intellectual Property India; Examination Report issued in Application No. 202127045297; 6 pages; dated Apr. 8, 2022.

*Primary Examiner* — Rinna Yi
(74) *Attorney, Agent, or Firm* — Gray Ice Higdon

(57) ABSTRACT

The present disclosure is generally related to systems and methods of rendering visual components on applications. At least one action-inventory can indicate to render a user interface component. A data processing system can identify a request from an input audio signal from a client device. The client device can display a first application in a foreground process. The data processing system can select an action-inventory to execute the action corresponding to the request by a second application. The data processing system can generate an action data structure using the action-inventory to provide to the second application. The data processing system can determine that an output of the second application is authorized to be presented with the first application. The data processing system can display, on the client device, a user interface component from the second application with the first application.

20 Claims, 5 Drawing Sheets

RENDERING VISUAL COMPONENTS ON APPLICATIONS IN RESPONSE TO VOICE COMMANDS

BACKGROUND

Applications can be installed on a computing device. The computing device can execute the application. The application can present digital content.

SUMMARY

According to a first aspect of the disclosure, a system to render visual components on applications. The system can include an agent registry executed on a data processing system having one or more processors. The agent registry can maintain a plurality of action-inventories for a plurality of applications. At least one of the plurality of action-inventories can indicate to render a user interface component for one of the plurality of applications in executing an action. The system can include a natural language processor executed on the data processing system. The natural language processor can receive a data packet comprising an input audio signal detected by a sensor of a client device. The client device can display a graphical user interface of a first application in a foreground process on the client device. The natural language processor can parse the input audio signal of the data packet to identify a request. The system can include an action handler executed on the data processing system. The action handler can select, from the plurality of action-inventories, an action-inventory that executes the action corresponding to the request by a second application of the plurality of applications. The second application can be installed on the client device and not in the foreground process. The action handler can generate an action data structure in accordance with the action-inventory. The system can include an agent interface executed on the data processing system. The agent interface can provide the action data structure to the second application to cause the second application to parse the action data structure and execute the action to generate an output. The agent interface can determine that the output of the second application from execution of the action is authorized to be presented with the graphical user interface of the first application based on an authorization policy of the second application. The agent interface can identify the user interface component of the second application for the action-inventory selected from the plurality of action-inventories, responsive to the determination the output of the second application is authorized to be presented with the first application. The agent interface can display, on the client device, the user interface component including the output from the second application with the graphical user interface of the first application authorized to be presented with the second application.

At least one of the plurality of action-inventories may have an address template for accessing the user interface component in executing the action, the address template defining a first portion and a second portion, the first portion corresponding to one of the plurality of applications, the second portion including an input variable in carrying out the action. The natural language processor may parse the input audio signal of the data packet to identify a parameter defining the request to be executed by the second application. The action handler may generate, in accordance with the address template of the action-inventory, an address to execute the action of the action-inventory, the address comprising a first substring and a second substring, the first substring corresponding to the second application, the second substring having the parameter used to control execution of the action; and generate the action data structure including the address generated by the action handler in accordance with the address template.

At least one of the plurality of action-inventories may have an address template for accessing the user interface component in executing the action, the address template defining a first portion and a second portion, the first portion corresponding to one of the plurality of applications, the second portion including an input variable in carrying out the action. The natural language processor may parse the input audio signal of the data packet to identify the parameter defining the request to be executed by the second application. The action handler to generate, in accordance with the address template of the action-inventory, an address to execute the action of the action-inventory, the address comprising a first substring and a second substring, the first substring corresponding to the second application, the second substring having the parameter used to control execution of the action. The agent interface may identify the user interface component of the second application for the action-inventory selected from the plurality of action-inventories using the address generated in accordance with the address template for the action-inventory.

Each action-inventory may have an agent identifier corresponding to one of the plurality of applications and a request identifier corresponding to the action. The natural language processor may parse the input audio signal of the data packet to identify an agent identifier corresponding to an agent, the agent corresponding to the second application installed on the client device. The action handler may select, from the plurality of action-inventories, the action-inventory for executing the action having the agent identifier corresponding to the agent identifier identified from parsing the input audio signal.

The action handler may determine that the interface mode indicator of the action-inventory specifies rendering of the user interface component in executing the action, and identify the user interface component of the second application for the action-inventory, responsive to the determination that the interface mode indicator specifies rendering of the user interface component.

The agent interface may determine that the client device is not authenticated with the second application for the action-inventory to carry out the action corresponding to a second request; and may present, responsive to the determination that the client device is not authenticated with the second application, a prompt interface on the client device to authenticate the client device with the second application to execute the action corresponding to the second request.

The agent interface may determine that an output of a third application is not authorized to be presented with the first application based on an authorization policy of the third application, the third application installed on the client device and not in the foreground process, set the third application as the foreground process of the client device, the first application transferred from the foreground process to a non-foreground process running on the client device, and display, on the client device, a graphical user interface of the third application including an output generated by the third application.

The agent interface may determine that the first application authorizes presentation of the user interface component of the second application with the graphical user interface of the first application based on an authorization policy of the first application, the authorization policy permitting user interface components from a first subset of the plurality of applications to be presented with the graphical user interface and restricting user interface components from a second subset of the plurality of applications to be presented with the graphical user interface, and display, on the client device, the user interface component including the output from the second application with the graphical user interface of the first application, responsive to the determination that the first application authorizes the presentation of the user interface component of the second application with the graphical user interface of the first application.

The agent interface may provide the action data structure to the second application to cause the second application to monitor for an interaction event on the user interface component from the second application presented with the graphical user interface of the first application and process, responsive to detection of the interaction event, the interaction event to update the user interface component.

The natural language processor may receive the data packet via a digital assistant application, the data packet comprising the input audio signal detected by the sensor of the client device, the client device displaying the graphical user interface of the digital assistant application corresponding to the first application in the foreground process. The agent interface may display, within the graphical user interface of the digital assistant application, the user interface component including a subcomponent indicating the request identified from parsing the input audio signal and the user interface component including the output from an agent corresponding to the second application. The agent may lack natural language processing capabilities.

The natural language processor may receive the data packet, the data packet comprising the input audio signal detected by the sensor of the client device, the client device displaying the graphical user interface of a first agent corresponding to the first application in the foreground process; and the agent interface to display the user interface component including the output from the second application as an overlay on the graphical user interface of the first agent.

The plurality of action-inventories may have a first subset of action-inventories and a second subset of action-inventories, the first subset including action-inventories defined by an administrator of the data processing system, the second subset including action-inventories provided by an agent service handling one of the plurality of applications.

The action handler may provide the action data structure to the second application to cause the second application to parse the action data structure to identify the action to be executed, generate the output by executing the action identified from the action data structure and provide the output for the user interface component to be presented with the graphical user interface of the first application authorized to be presented with the second application.

According to a second aspect of the disclosure, a method of rendering visual components on applications. A data processing system having one or more processors can maintain a plurality of action-inventories for a plurality of applications. At least one of the plurality of action-inventories can indicate to render a user interface component for one of the plurality of applications in executing an action. The data processing system can receive a data packet comprising an input audio signal detected by a sensor of a client device. The client device can display a graphical user interface of a first application in a foreground process on the client device. The data processing system can parse the input audio signal of the data packet to identify a request. The data processing system can select, from the plurality of action-inventories, an action-inventory that executes the action corresponding to the request by a second application of the plurality of applications. The second application can be installed on the client device and not in the foreground process. The data processing system can generate an action data structure in accordance with the action-inventory. The data processing system can provide the action data structure to the second application to cause the second application to parse the action data structure and execute the action to generate an output. The data processing system can determine that the output of the second application from execution of the action is authorized to be presented with the graphical user interface of the first application based on an authorization policy of the second application. The data processing system can identify the user interface component of the second application for the action-inventory selected from the plurality of action-inventories, responsive to the determination the output of the second application is authorized to be presented with the first application. The data processing system can display, on the client device, the user interface component including the output from the second application with the graphical user interface of the first application authorized to be presented with the second application.

Optional features of the first aspect described above or in the detailed description below may be combined with the second aspect.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
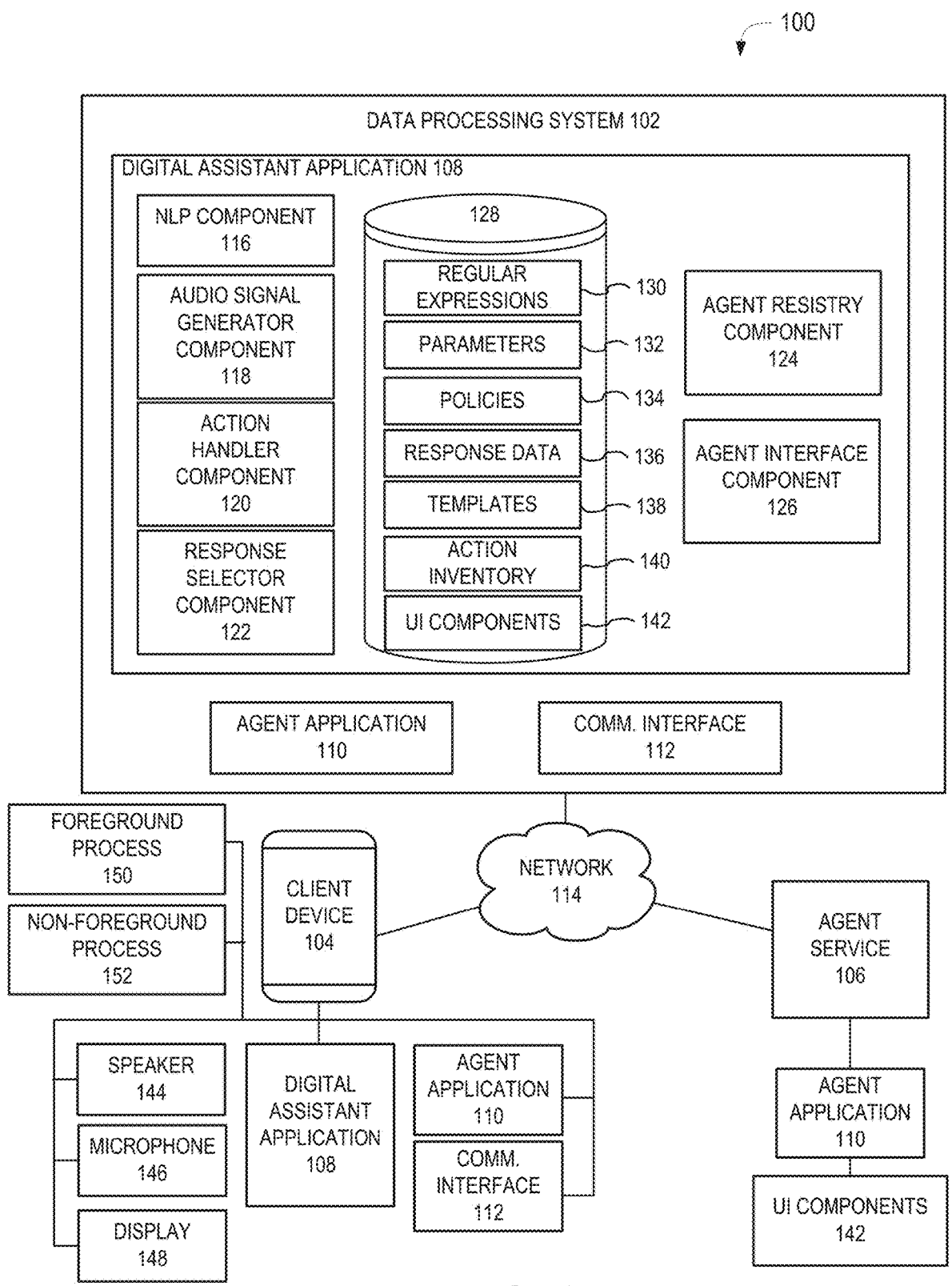
FIG. 1 illustrates a block diagram of an example system to render visual components on applications in response to voice input commands, in accordance with an example of the present disclosure.

Following below are more detailed descriptions of various concepts related to and implementations of, methods, apparatuses, and systems to render visual components on applications in response to voice input commands. The various concepts introduced above and discussed in greater detail below may be implemented in any of numerous ways.

Multiple applications can be installed on a client device to carry out preconfigured functions as requested by a user operating the client device. At a given time, the client device can run a subset of these applications as a foreground process or a non-foreground process as set by an operating system running on client device. Foreground processes (including visible processes) can correspond to applications with a graphical user interface presented on a display of the client device with which the user may be interacting. Non-foreground processes (e.g., a service process, a background process, or a cached process) can correspond to applications not displaying visual components to the user and executing without affecting the graphical user interface of the foreground process. The applications running on the client device can switch back and forth between executing as a foreground process or non-foreground process. Upon switching, the graphical user interface of the application that was previously the foreground process can be replaced by the graphical user interface of the application that is now set as the foreground process. In addition, the processing and memory allocations can change as a result of the switching between foreground and non-foreground processes.

One of these applications running in the foreground or the non-foreground can include a digital assistant application. Unlike at least some of the other applications installed on the client device, the digital assistant application can have natural language processing capabilities. Configured with these capabilities, the digital assistant application can acquire and parse an input audio signal detected via a microphone of the client device to recognize words from the input audio signal. From the recognized words, the digital assistant application can determine a request to be carried out and one or more parameters defining the request. The request can refer to one of the preconfigured functions with input arguments compatible with the parameters that can be executed by the digital assistant application (e.g., retrieving results for a search query). For such requests, the digital assistant application itself can process the request and present an audio or visual output from carrying out the request. Some requests, however, may not correspond to any of the functions preconfigured on the digital assistant application (e.g., playing a video from an online video platform). For these types of requests, the digital assistant application can identify another application that is capable of carrying out the request and invoke the function of the application to pass parameters.

By invoking the other application to carry out the request, the digital assistant application can cause a change in which applications are foreground and non-foreground processes, resulting in a shift in the graphical user interface displayed on the client device. In addition, the processing and memory allocations to each executing application can change and fluctuate, especially when invoking a previously non-executing application. While the desired request may be eventually carried out on the client device with the invoked application, the switch can interfere with the overall user experience with the applications on the client device. For example, the sudden alteration in the graphical user interface displayed on the client device can force the user to under context switching between the interfaces of multiple applications, thereby degrading human-computer interactions (HCI) with the client device. The degradation in the client device can also be exacerbated by change and fluctuation in the new allocations of computing resources in performing the switching of foreground and non-foreground processes.

The present disclosure provides an improved user interface. In particular, to address the technical challenges in interfacing, the present disclosure can provide action-inventories used to identify and present user interface components to be overlaid on the graphical user interfaces of applications in the foreground. The action-inventory can specify whether to provide a user interface element of the application while maintaining the application in the background. The action-inventory can also include an address template to construct an address for accessing a function of the digital assistant application and for providing the user interface element on the client device. The address template of an action-inventory may be, for example, a Uniform Resource Identifier (URI) template for constructing a web address with a hostname, pathname, and queries to invoke a function of an application and for the user interface component. The hostname (or a scheme) can reference a location or a domain name of the application. The pathname can reference the function. The queries can include one or more input arguments used to carry out the function. The address template can also define a mapping of the request parsed from input audio signals to functions to be executed by the application.

Upon the recognition of the request from the input audio signal, the digital assistant application can determine that the request does not correspond with any of the functionalities of the digital assistant application or to any application running as the foreground process. Instead of outputting that the digital assistant application cannot perform the indicated request, the digital assistant application can identify another application to carry out the function. While processing the request, the digital assistant application can remain as a background process with the original application remaining as the foreground process. With the identification, the digital assistant application can select an action-inventory of the application for the function. The selected action-inventory can indicate that a user interface component of the application is to be presented. Using the action-inventory, the digital assistant application can construct, expand, and generate the address for the function in accordance with the address template. The address can include the hostname (or scheme) referencing the application, the path referencing the function and the user interface component, and one or more queries including the parameters.

With the generation of the address in accordance with the address template, the digital assistant application can generate and pass an action data structure (e.g., an API function call) including the address to the application. The application to which the action data structure is passed can be opened as a background process, and remain in the background process as the action is processed and completed. The passing of the action data structure to the other application can be performed as the original application continues to remain as the foreground process. For example, the action data structure can be passed by an operating system on the client device from the digital assistant application to the application via the API function call. As the address includes the hostname referencing the application, the action data structure can be directed to reach the referenced application. Upon receipt, the application can parse the action data structure to identify the address. The application can further parse the address to identify the pathname to identify the function to be executed and parse the string query to identify the one or more parameters to define the execution of the function. Based on the identification, the application can execute the function to generate an output. Using the output generated by the application, the digital assistant can render the user interface component of the application. The user interface component of the application can be overlaid on the graphical user interface of the application of the foreground process.

In this manner, the digital assistant application can invoke the functions of other applications and present rendering of the user interface components from these applications, thereby augmenting the functions of the digital assistant application. The invocation may be performed without the user manually searching, opening, and entering to achieve the desired function, or having to context switch between different applications. The elimination of context switching on the part of the user operating the client device can thus improve HCI. Furthermore, the applications can remain in the foreground and non-foreground processes, even with the recognition of a request from the input audio signal. As the switching between foreground and background processes is eliminated, the digital assistant application can reduce consumption of computing resources and expenditure of time on the part of the user.

Referring to FIG. 1, depicted is an example system 100 to render visual components on applications. The system 100 can include at least one data processing system 102, at least one client device 104, and at least one agent services 106. The data processing system 102, the client device 104, and the agent service 106 can be communicatively coupled with one another via at least one network 114.

The components of the system 100 can communicate over a network 114. The network 114 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 114 can include a wireless link, such as an infrared channel or satellite band. The topology of the network 114 may include a bus, star, or ring network topology. The network 114 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The data processing system 102 and the agent service 106 each can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 and the agent service 106 each can include servers in a data center that are stored in one or more high-density rack systems, along with associated storage systems, located for example in an enterprise data center. In this way, the data processing system 102 or the agent service 106 with consolidated servers can improve system manageability, data security, the physical security of the system, and system performance by locating servers and high performance storage systems on localized high performance networks. Centralization of all or some of the data processing system 102 or agent service 106 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repositories 128 and with other computing devices. The agent service 106 can also include at least one processing unit, server, virtual server, circuit, engine, agent, appliance, or other logic device such as programmable logic arrays configured to communicate with a data repository and with other computing devices.

The data processing system 102 can include an instance of at least one digital assistant application 108. The digital assistant application 108 can include at least one natural language processor (NLP) component 116 (sometimes referred herein as an natural language processor) to parse audio-based inputs. The digital assistant application 108 can include at least one audio signal generator component 118 (sometimes referred herein as an audio signal generator) to generate audio-based signals. The digital assistant application 108 can include at least one action handler component 120 (sometimes referred herein as an action handler) to generate action data structures based on the audio-based inputs. The digital assistant application 108 can include at least one response selector component 122 to select responses to audio-based input signals. The digital assistant application 108 can include at least one agent registry component 124 (sometimes referred herein as an agent registry) to maintain action-inventories for generating the action data structures. The digital assistant application 108 can include at least one agent interface component 126 (sometimes referred herein as agent interface) to communicate with one or more agent applications 110.

The digital assistant application 108 can include at least one data repository 128. The data repository 128 of the data processing system 102 can include one or more local or distributed databases and can include a database management system. The data repository 128 can include one or more regular expressions 130, one or more data parameters 132, one or more policies 134, one or more response data 136, one or more templates 138, and one or more action inventories 140. The NLP component 116, the audio signal generator component 118, the action handler component 120, the response selector component 122, the agent registry component 124, the agent interface component 126, and the data repository 128 can be separate from one another. The data repository 128 can include computer data storage or memory and can store the one or more regular expressions 130, one or more data parameters 132, one or more policies 134, response data 136, templates 138, and the one or more action-inventories 140 among other data. The data parameters 132, policies 134, and templates 138 can include information such as rules about a voice-based session between the client devices 104 and the data processing system 102. The response data 136 can include content items for audio output or associated metadata, as well as input audio messages that can be part of one or more communication sessions with the client devices 104. The action-inventories 140 can include information to invoke or interface with the agent application 110.

The data processing system 102 can include an instance of at least one agent application 110 (also referred herein as "agent" or "application") to execute various functions. The agent service 106 can include an instance of at least one agent application 110 to execute various functions. The agent application 110 can lack natural language processing capabilities (such as those provided by the NLP component 116). The agent application 110 can also have a preconfigured or a predetermined set of input capabilities. The input capabilities of the agent application 110 can include, for example, inputs from a mouse, a keyboard, a touch screen (e.g., a display 148), or a camera of the client device 104. The input capabilities of the agent application 110 can lack audio (e.g., a microphone 146) from the client device 104. The agent application 110 can have a graphical user interface (GUI) to receive the inputs from the client device 104. Based on the input from the predetermined input capabilities, the agent application 110 can carry out or execute one or more functions. For example, the agent application 110 can be a coffee purchase application, and can have a graphical user interface with one or more element to specify an order of a coffee. In this application, a user operating the client device 104 can manually enter the coffee, size, and billing information, among others, on the graphical user interface rendered on the display 148 of the client device 104. Once set, the agent application 110 on the client device 104 can send the input via the network 114 to the agent service 106. The agent service 106 in turn can carry out the purchase order indicated by the inputs entered through the graphical user interface of the agent application 110.

The components of the data processing system 102 can each include at least one processing unit or other logic device such as a programmable logic array engine or module configured to communicate with the data repository 128. The components of the data processing system 102 can be separate components, a single component, or part of multiple data processing systems 102. The system 100 and its components, such as a data processing system 102, can include hardware elements, such as one or more processors, logic devices, or circuits.

The functionalities of the data processing system 102, such as the digital assistant application 108 or the agent application 110, can be included or otherwise be accessible from the one or more client devices 104. The functionalities of the data processing system 102 may correspond to the functionalities or interface with the digital assistant application 108 executing on the client devices 104. The client devices 104 can each include and execute a separate instance of the one or more components of the digital assistant application 108. The client devices 104 can otherwise have access to the functionalities of the components of the digital assistant application 108 on a remote data processing system 102 via the network 114. For example, the client device 104 can include the functionalities of the NLP component 116 and access the remainder of the components of the digital assistant application 108 via the network 114 to the data processing system 102. The functionalities of the data processing system 102 may correspond to the functionalities or interface with the agent application 110 executing on the client devices 104. The client devices 104 can otherwise have access to the functionalities of the components of the agent application 110 on the data processing system 102 or the agent service 106 via the network 114. For example, the client device 104 can pre-process input from the mouse, keyboard, touchscreen, or camera for the agent application 110, and provide the input to the agent service 106 to carry out the function of the agent application 110. The digital assistant application 108 executing on the client device 104 can include the functionalities of the digital assistant application 108 executing on the data processing system 102.

The client device 104 can each include at least one logic device such as a computing device having a processor to communicate with each other with the data processing system 102 via the network 114. The client devices 104 can include an instance of any of the components described in relation to the data processing system 102 or the agent service 106. The client device 104 can include an instance of the digital assistant application 108. The client device 104 can include an instance of the agent application 110. The client devices 104 can include a desktop computer, laptop, tablet computer, personal digital assistant, smartphone, mobile device, portable computer, thin client computer, virtual server, speaker-based digital assistant, or other computing device.

The client device 104 can include, execute, interface, or otherwise communicate with one or more of at least one instance of the digital assistant application 108, at least one instance of the agent application 110, and at least one communications interface 112, among others. In addition, the client device 104 can include, interface, or otherwise communicate with at least one speaker 144, at least one microphone 146, and at least one display 148. The client device 104 can include an audio driver to provide a software interface with the speaker 144 and the microphone 146. The audio driver can execute instructions provided by the data processing system 102 to control the speaker 144 to generate a corresponding acoustic wave or sound wave. The audio driver can execute an audio file or other instructions to convert an acoustic wave or sound wave acquired from the microphone 146 to generate audio data. For example, the audio driver can execute an analog-to-driver converter (ADC) to transform the acoustic wave or sound wave to the audio data. The client device 104 can include a graphics driver to provide a software interface with the display 148. The graphics driver can execute instructions provided by the data processing system 102 or the agent service 106 to control the display 148 to generate a corresponding rendering thereon.

The instance of the digital assistant application 108 on the client device 104 can include or be executed by one or more processors, logic array, or memory. The instance of the digital assistant application 108 on the client device 104 can detect a keyword and perform an action based on the keyword. The digital assistant application 108 on the client device 104 can be an instance of the digital assistant application 108 executed at the data processing system 102 or can perform any of the functions of the digital assistant application 108. The instance of the digital assistant application 108 on the client device 104 can filter out one or more terms or modify the terms prior to transmitting the terms as data to the data processing system 102 (e.g., the instance of the digital assistant application 108 on the data processing system 102) for further processing. The instance of the digital assistant application 108 on the client device 104 can convert the analog audio signals detected by the speaker 144 into a digital audio signal and transmit one or more data packets carrying the digital audio signal to the data processing system 102 via the network 114. The instance of the digital assistant application 108 on the client device 104 can transmit data packets carrying some or the entire input audio signal responsive to detecting an instruction to perform such transmission. The instruction can include, for example, a trigger keyword or other keyword or approval to transmit data packets comprising the input audio signal to the data processing system 102.

The instance of the digital assistant application 108 on the client device 104 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can keep frequencies that correspond to a human voice or human speech, while eliminating frequencies that fall outside the typical frequencies of human speech. For example, a bandpass filter can remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The instance of the digital assistant application 108 on the client device 104 can apply the bandpass filter prior to transmitting the input audio signal to the data processing system 102, thereby reducing network bandwidth utilization. However, based on the computing resources available to the client device 104 and the available network bandwidth, it may be more efficient to provide the input audio signal to the data processing system 102 to allow the data processing system 102 to perform the filtering. The instance of the digital assistant application 108 on the client device 104 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102 and manage rendering of a graphical user interface provided via the display.

The client device 104 can be operated by an end user that enters voice queries as audio input into the client device 104 (via the microphone 146 or speaker 144) and receives audio (or other) output from the data processing system 102 or agent services 106 to present, display, or render to the end user of the client device 104. The digital component can include a computer-generated voice that can be provided from the data processing system to the client device 104. The client device 104 can render the computer-generated voice to the end user via the speaker 144. The computer-generated voice can include recordings from a real person or computer-generated language. The client device 104 can provide visual output via the display 148 communicatively coupled to the client device 104.

The client device 104 can have or execute as at least one foreground process 150 (also referred herein as a foreground service). The foreground process 150 can correspond to at least one of the applications (e.g., the digital assistant application 108 or an agent application 110) that is rendered on the display 148 and executing on the client device 104. For example, the foreground process 150 can correspond to an application with a graphical user interface occupying a majority of the display 148. The application running on the client device 104 as the foreground process 150 can have a graphical user interface rendered on the display 148 of the client device 104. The graphical user interface of the application in the foreground process 150 can occupy at least a portion of the display 148 of the client device 104 (e.g., at least a third the display 148). The application running on the client device 104 as the foreground process 150 can wait for user interactions with the graphical user interface (e.g., via the I/O devices communicatively coupled with the client device 104) to carry out one or more routines. The application in the foreground process 150 can process the user interactions to carry out the one or more routines of the application. In the processing of the user interactions, the application in the foreground process 150 can generate an output and can render the resultant output on the graphical user interface of the application in the foreground process 150.

The client device 104 can have or execute at least one non-foreground process 152 (also referred herein as a background process, a background service, non-foreground process, or a non-foreground service). The non-foreground process 152 can correspond to at least at least one of the applications (e.g., the digital assistant application 108 or another agent application 110) that is not rendered on the display 148 and executing on the client device 104. The application running on the client device 104 as the non-foreground process 152 can lack any rendering of the graphical user interface of the application on the display 148 of the client device 104. For example, the non-foreground process 152 can correspond to an application that is minimized and without any graphical user interface component rendered in the display 148. The application running on the client device 104 as the non-foreground process 152 can execute one or more routines without receipt of any user interactions with the application. For example, an application running as the non-foreground process 152 can process audio detected on the microphone 146 of the client device 104, without having any graphical user interface rendered on the display 148. In the processing of the user interactions, the application in the foreground process 150 can generate an output without rendering the resultant output as a part of the graphical user rendered on the display 148.

The client device 104 can manage the applications in the foreground process 150 and the non-foreground process 152 (e.g., using an operating system executing on the client device 104). The client device 104 can switch applications between the foreground process 150 and the non-foreground process 152. The switch of the applications between the foreground process 150 and the non-foreground process 152 can be in response to an invocation of at least one application. The invoked application can be running in the non-foreground process 152 or in neither the foreground process 150 and the non-foreground process 152. The invocation can be by the operating system executing on the client device 104, by another application (e.g., the digital assistant application 108 or the agent application 110), or by a user interaction event. In response to the invocation, the client device 104 can set an application running in the foreground process 150 to the non-foreground process 152. In addition, the client device 104 can set an application running in the non-foreground process 152 to the foreground process 150. When the invoked application is not running as the non-foreground process 152, the client device 104 can also instantiate the application into the foreground process 150. For example, a web browser can be executing on the client device 104 as the foreground process 150 with a graphical user interface rendered on the display 148. A clock application can be running on the client device 104 as the non-foreground process 152 to track time, without the rendering of any graphical user interface rendered on the display 148. Upon the invocation of an alarm function of the clock application, the client device 104 can set the web browser as the non-foreground process 152 thereby removing the rendering of the graphical user interface of the web browser. In conjunction, the client device 104 can set the clock application as the foreground process 150.

The data processing system 102 and the agent service 106 each can include at least one server having at least one processor. For example, the data processing system 102 and the agent service 106 each can include a plurality of servers located in at least one data center or server farm. The data processing system 102 can include at least one computation resource or server. The data processing system 102 can include, interface, or otherwise communicate with at least one communications interface 112. The data processing system 102 can include, interface, or otherwise communicate with at least one instance of the digital assistant application 108 on the data processing system 102. The instance of the digital assistant application 108 on the data processing system 102 can include, interface, or otherwise communicate with: the at least one NLP component 116, the at least one audio signal generator component 118, at least one action handler component 120, the at least one response selector component 122, the at least one agent registry component 124, and the at least one agent interface component 126, among others. The data processing system 102 can include, interface, or otherwise communicate with at least one data repository 128. The at least one data repository 128 can include or store, in one or more data structures or databases, regular expressions 130, data parameters 132, policies 134, response data 136, templates 138, and action-inventories 140. The data repository 128 can include one or more local or distributed databases, and can include a database management.

The instance of digital assistant application 108 of the data processing system 102 can execute or run an instance of the agent registry component 124 to maintain the set of action-inventories 140 on the data repository 128. The agent registry component 124 can maintain and store the set of action-inventories 140 for one or more agent applications 110 on the data repository 128. A subset of the action-inventories 140 can be defined by an administrator of the data processing system 102 or the digital assistant application 108 for an application type corresponding to the agent application 110. For example, the administrator of the digital assistant application 108 can configure or define a built-in set of action-inventories 140 for purchase order applications. Another subset of action-inventories 140 can be provided by one of the agent services 106 handling resources for the corresponding agent application 110. At least one of the action-inventories 140 can be a preset action-inventory 140 to be used to carry out an action, in response to determining that a request does not match any other action-inventory 140 of the agent application 110. For example, the agent service 106 can provide a set of customized action-inventories 140 to the data processing system 102 for storage onto the data repository 128. The agent registry component 124 can receive the subset of action-inventories 140 provided by the agent service 106. Upon receipt, the agent registry component 124 can store the received action-inventories 140 onto the data repository 128. The existence of the action-inventory 140 for the action of the agent application 110 on the data repository 128 can indicate that the agent application 110 is capable of performing the action corresponding to the action-inventory 140.

The agent registry component 124 can maintain and store a set of user interface components 142 for one or more agent applications 110 on the data repository 128. Each user interface component 142 can be associated with at least one of the action-inventories 140. A subset of the user interface components 142 can be defined by an administrator of the data processing system 102 or the digital assistant application 108. For example, the administrator of the digital assistant application 108 can configure or define a built-in set of user interface components 142. Another subset of user interface components 142 can be provided by one of the agent services 106 handling resources for the corresponding agent application 110. The agent service 106 can store and maintain the user interface component 142 corresponding to the subset. For example, the agent service 106 can provide a set of customized user interface components 142 to the data processing system 102 for storage onto the data repository 128. The agent registry component 124 can receive the subset of user interface components 142 provided by the agent service 106. Upon receipt, the agent registry component 124 can store the received user interface components 142 onto the data repository 128. The maintenance of the user interface components 142 by the agent service 106 can be separate from the maintenance of the user interface component 142 on the data repository 128.

Each user interface component 142 can have one or more interface elements. Each interface element can correspond to a subcomponent of the user interface component 142. At least one interface element can correspond to a request to be identified from input audio signals detected by the microphone 146 of the client device 104. At least one interface element can correspond to a response indicating an output generated by the agent application 110 associated with the user interface component 142. Furthermore, each user interface component can have one or more properties. The properties can include an element type (e.g., command button, scroll bar, textbox, and image), a size, a location within the user interface component 142, transparency, and shape, among others. For example, a user interface component 142 can have a button located generally along the bottom, a textbox above the button, and a slot for an image generally in the middle, among others. The user interface component 142 itself can have one or more properties. The properties of the user interface component 142 can include a size, a location within the display 148, transparency, and shape, among others.

Each action-inventory 140 can have at least one address template for at least one action by one of the agent applications 110. The address template may be for a single action of the agent application 110 or multiple actions to be carried by the agent application 110. The address template may be also for accessing or retrieving the user interface component 142 to be generated in carrying out the action. The address template for the action can include a first portion and a second portion. The address template can be, for example, a Uniform Resource Identifier (URI) template in accordance to which an URI is to be generated. The first portion of the address template can correspond to one of the agent applications 110 or the agent service 106 providing resources for the agent application 110. For example, the first portion of the address template can include a scheme in a custom deep-link URI referencing the agent application 110. The first portion of the address template can also include a hostname referencing the agent service 106.

The second portion of the address template can correspond to the action that is to be performed by the agent application 110. The second portion of the address template can also include one or more input variables (also referred herein as input arguments of fields) used to execute the action. For example, the second portion of the address template can include a pathname in a URI corresponding to the action to be taken. The second portion can also include one or more query strings following the pathname in the URI. Each query string can correspond to one of the input variables used to execute the action. A subset of the input variables can include optional or auxiliary input variables. The action can be executed by the agent application 110 without the auxiliary input variables in the address.

The action-inventory 140 can include a mapping (sometimes referred herein as a parameter mapping) for the second portion of the address template. The mapping can specify or define a correspondence between at least one input variable of the second portion and one or more words to be identified from parsing input audio signals. The one or more words from parsing input audio signals can correspond to the input variables defining the action to be executed by the agent application 110. The mapping can define the insertion of the words into the input variables of the address template. For example, the mapping for a coffee purchase order action can specify insertion of a coffee name parsed from the audio signal to a coffee input variable of the address template. The action-inventory 140 can specify or include a set of permitted values (sometimes referred as an entity-inventory) for each input variable. The set of permitted values can be a part of the mapping for the action-inventory 140. For example, the permitted values for a coffee purchase order can include "latte," "café latte," and "latte coffee," and the like for an input variable for the coffee name. The action-inventory 140 can also include a marker indicating a corresponding input variable of the address template as optional or auxiliary. The marker can be part of the mapping for the second portion of the address template.

In addition to the address template, each action-inventory 140 maintained by the agent registry component 124 can include information related to the action for the action-inventory 140. The action-inventory 140 can include an interface mode indicator. The indicator can specify whether the user interface component 142 of the agent application 110 is to be displayed in carrying out the action. The user interface component 142 can be a visual element to be rendered in the display 148 of the client device 104. The user interface component 142 can have a size less than a size of the display 148. For example, the user interface component 142 can include a box-sized visual element to occupy a 12.5% to 25% of the display 148. The user interface component 142 can be associated with at least one of the action-inventories 140 maintained on the data repository 128.

The user interface component 142 can be associated with the action-inventory 140. The action-inventory 140 can include an address referencing the user interface component 142. The address referencing the user interface component 142 can differ or be separate from the address template for executing the action. The address referencing the user interface component 142 can have the same scheme or hostname as the address template for the same action-inventory 140. For example, the address can include the hostname of the agent service 106 managing resources for the agent application 110. The address referencing the user interface component 142 can have a different hostname as the address template of the same action-inventory 140. For example, the hostname can reference the data repository 128 of the data processing system 102. The action-inventory 140 can also include an user interface identifier corresponding to the user interface component 142. The identifier may be used to index and reference the user interface component 142 maintained on the data repository 128. In addition, the address template of the action-inventory 140 can be used to reference the user interface component 142 along with the action to be executed by the agent application 110.

The action-inventory 140 can also include at least one agent identifier corresponding to one of the agent applications 110 to carry out the action. The agent identifier can include a set of alphanumeric characters referencing the agent application 110. The agent identifier can be used to identify the agent application 110 associated with the action-inventory 140 from words parsed from input audio signals. The action-inventory 140 can include at least one request identifier corresponding to the action to be carried by the agent application 110. The request identifier (sometimes referred herein as an "intent identifier" or "intent name") can include a set of alphanumeric characters referencing the action to be carried out. The address template can be uniquely identified by one or more request identifiers. The request identifier can be used to identify the action-inventory 140 from words parsed from input audio signals.

Each action-inventory 140 can be implemented or specified using a markup language, such as an Extensible Markup Language (XML) file. For example, the action-inventory 140 can be an XML file of the following form:

```
<actions>
    <action intentName="actions.intent.CHECK_STEPS" >
        <fulfillment
            fulfillmentMode="actions.fulfillment.SLICE"
            urlTemplate="https://ex_personalmetrics.example.com/checksteps{?username}">
            <parameter-mapping
                intentParameter="user.name"
                urlParameter="username"
                required="true" />
        </fulfillment>
        <fulfillment urlTemplate = "https://ex_personalmetrics.example.com/checksteps" />
    </action>
</actions>
```

In the example above, the action-inventory 140 can be for an order ride to be executed by a personal fitness application. The entry "actions.intent.CHECK_STEPS" may correspond to the request identifier for the action-inventory 140. The entry "actions.fulfillment.SLICE" can specify the display of the user interface component 142 associated with the action-inventory 140. The entry "https://ex_personalmetrics.example.com/checksteps{?username}" can correspond to the address template, in which "https://ex_personalmetrics.example.com/ corresponds to the first portion and "checksteps{?username}" corresponds to the second portion. The entry starting with "parameter-mapping" may correspond to the mapping. Lastly, the entry "https://ex_personalmetrics.example.com/checksteps" can correspond to a separate address for the user interface component 142.

The agent registry component 124 can construct, create, or generate the set of action-inventories 140 for each agent application 110. The agent service 104 for the agent application 110 can provide a configuration file associated with the agent application 110 to the agent registry component 124 via the network 114. The configuration file can be, for example, an application binary interface (ABI) for the agent application 110 submitted by an application developer associated with the agent application 110 to the agent registry component 124. The agent service 104 for the agent application 110 can provide metadata associated with the agent application 110. The metadata can include the agent identifier and an application type to the agent registry component 124, among others. The application type can indicate a usage of the agent application 110. The agent service 104 for the agent application 110 can provide the interface mode indicator for one or more actions capable of being executed by the agent application 110. The agent registry component 124 can receive the information from the agent service 106 for the generation of the set of action-inventories 140 of the agent application 110.

The agent registry component 124 can read, ingest, and parse the configuration file for the agent application 110 to identify one or more actions. For each identified function, the agent registry component 124 can generate an action-inventory 140 for the action. The action can be one of the actions of the set of action-inventories 140 defined by the administrator of the data processing system 102 or the digital assistant application 108 for the application type of the agent application 110. The agent registry component 1240 generate the address template for the action to be executed by the agent application 110. The first portion of the address template (e.g., the hostname or scheme) can correspond to the agent application 110. The second portion of the address template can be predefined for the action (e.g., using a preset pathname or a query string). The agent registry component 124 can also generate a mapping for the action-inventory 140 for the identified function. The agent registry component 124 can include or add a request identifier corresponding to the identified action into the action-inventory 140. The mapping can include the set of permitted values for the input variables of the address template. The agent registry component 124 can include or add an agent identifier corresponding to the agent application 110 into the action-inventory 140. With the construction of the action-inventory 140, the agent registry component 124 can store the action-inventory 140 onto the data repository 128.

The data processing system 102 can include at least one communications interface 112. The communications interface 112 can be configured, constructed, or operational to receive and transmit information using, for example, data packets. The communications interface 112 can receive and transmit information using one or more protocols, such as a network protocol. The communications interface 112 can include a hardware interface, software interface, wired interface, or wireless interface. The communications interface 112 can be a data interface or a network interface that enables the components of the system 100 to communicate with one another. The communications interface 112 of the data processing system 102 can provide or transmit one or more data packets that include the action data structure, audio signals, or other data via the network 114 to the client devices 104 or the agent service 106. For example, the data processing system 102 can provide the output signal from the data repository 128 or from the audio signal generator component 118 to the client devices 104.

The data processing system 102 can also instruct, via data packet transmissions, the client devices 104 to perform the functions indicated in the action data structure. The output signal can be obtained, generated, transformed to, or transmitted as one or more data packets (or other communications protocol) from the data processing system 102 (or other computing device) to the client devices 104. The communications interface 112 can facilitate translating or formatting data from one format to another format. For example, the communications interface 112 can include an application programming interface ("API") that includes definitions for communicating between various components, such as software components. An application, script, program, or other components that are associated with the data processing system 102 can be installed at the client devices 104. The application can enabled the client devices 104 to communicate input audio signals (and other data) to the communications interface 112 of the data processing system 102.

The data processing system 102 can include an application, script, or program installed at the client device 104, such as the instance of the digital assistant application 108 on the client device 104 to communicate input audio signals to the communications interface 112 of the data processing system 102 and to drive components of the client computing device to render output audio signals or visual output. The data processing system 102 can receive data packets, a digital file, or other signals that include or identify an input audio signal (or input audio signals). The client device 104 can detect the audio signal via the speaker 144 and convert the analog audio signal to a digital file via an analog-to-digital converter. For example, the audio driver can include an analog-to-digital converter component. The pre-processor component can convert the audio signals to a digital file that can be transmitted via data packets over network 114.

The instance of the digital assistant application 108 of the data processing system 102 or the client device 104 can execute or run an NLP component 116 to receive or obtain the data packets including the input audio signal detected by the microphone 146 of the client device 104. The data packets can provide a digital file. The NLP component 116 can receive or obtain the digital file or data packets comprising the audio signal and parse the audio signal. For example, the NLP component 116 can provide for interactions between a human and a computer. The NLP component 116 can be configured with techniques for understanding natural language and enabling the data processing system 102 to derive meaning from human or natural language input. The NLP component 116 can include or be configured with techniques based on machine learning, such as statistical machine learning. The NLP component 116 can utilize decision trees, statistical models, or probabilistic models to parse the input audio signal.

The NLP component 116 can perform, for example, functions such as named entity recognition (e.g., given a stream of text, determine which items in the text map to names, such as people or places, and what the type of each such name is, such as person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 116 (and the digital assistant application 108 as a whole) can execute as one of the applications in the non-foreground process 152. When the input audio signal is detected on the microphone 146, the client device 104 can continue to the digital assistant application 108 as one of the applications in the non-foreground process 152. The client device 104 can have one or more other applications (e.g., an agent application 110) running as the non-foreground processes 152. Furthermore, the client device 104 can have at least one application (e.g., another agent application 110) running in the foreground process 150. The instance of the NLP component 116 of the digital assistant application 108 on the client device 104 can initiate processing of the input audio signal without switching of the foreground process 150 or the non-foreground process 152. The applications running as the foreground process 150 and the non-foreground process 152 can be maintained. For example, the NLP component 116 on the client device 104 can receive and apply the natural language processing functions on the input audio signal, without minimizing a graphical user interface of an application running as the foreground process 150. Alternatively, the NLP component 116 (and the digital assistant application 108 as a whole) can execute as one of the applications in the foreground process 150, when the input audio signal is received. Subsequent to the receipt of the input audio signal, the digital assistant application 108 can continue to execute as one of the applications in the foreground process 150 of the client device 104.

The NLP component 116 can parse and convert the input audio signal into recognized string by comparing the input signal against a stored, representative set of audio waveforms (e.g., in the data repository 128) and choosing the closest matches. The NLP component 116 can also partition or divide the input audio signal into one or more audio segments of a time duration (e.g., 15 seconds to 2 minutes) to process each segment. The set of audio waveforms can be stored in data repository 128 or other database accessible to the data processing system 102. The representative waveforms are generated across a large set of users, and then may be augmented with speech samples from the user. After the audio signal is converted into recognized text, the NLP component 116 matches the text to words that are associated, for example via training across users or through manual specification, with actions that the data processing system 102 can serve. The NLP component 116 can determine that the input audio signal acquired from the microphone 146 does not contain any recognizable strings. The NLP component 116 can determine that the input audio signal contains silence (e.g., with a maximum amplitude of less than 0 dB) in determining that the input audio signal does not contain any recognizable strings. Additionally, the NLP component 116 can determine a signal-to-noise (SNR) of the input audio signal. The NLP component 116 can compare the SNR of the input audio signal to a threshold SNR (e.g., −20 dB). Responsive to the determination the SNR of the input audio signal is greater than the threshold SNR, the NLP component 116 can determine that the input audio signal does not contain any recognizable strings.

The data processing system 102 can receive image or video input signals, in addition to, or instead of, input audio signals. The NLP component 116 can convert image or video input to text or digital files. The NLP component 116 can process, analyze, or interpret image or video input to perform actions, generate requests, or select or identify data structures. The data processing system 102 can process the image or video input signals using, for example, image interpretation techniques, computer vision, a machine-learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 116) can be configured with the imaging techniques, in addition to, or instead of, audio processing techniques.

From parsing the input audio signal, the NLP component 116 can determine or identify at least one request. The input audio signal can include, for example, a query, question, command, instructions, or other statement in a natural language. The request can correspond to at least one trigger keyword identified from the recognized string converted from the input audio signal. The request can indicate an action to be taken. For example, the NLP component 116 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a request for transport. In this example, the input audio signal (or the identified request) does not directly express an intent for transport, however the trigger keyword indicates that transport is an ancillary action to at least one other action that is indicated by the request.

To identify the request, the NLP component 116 can apply a semantic processing technique to the input audio signal to identify the trigger keyword corresponding to the request. The NLP component 116 can apply a semantic processing technique to the input audio signal to identify a trigger phrase that includes one or more trigger keywords, such as a first trigger keyword and a second trigger keyword. For example, the input audio signal can include the sentence "Find the nearest café." The NLP component 116 can determine that the input audio signal includes a trigger keyword "find." The NLP component 116 can determine that the request is to search for a location near the client device 104.

In addition to the request, the NLP component 116 can identify at least one parameter defining the request. The parameter can define the request, functioning as a supplement or a constraint on the action corresponding to the request to be taken. The parameter can further specify the action to be-taken. The parameter can include a subset of the recognized strings (excluding the trigger keywords) converted from the input audio signal. The NLP component 116 can apply a semantic processing technique to the input audio signal to identify one or more descriptor words related to the identified trigger keyword. From the example "Find the nearest café," the NLP component 116 may have identified the term "Find" as the trigger keyword. In conjunction, the NLP component 116 can identify "nearest" as a first parameter and "café" as a second parameter defining the request "find."

Furthermore, the NLP component 116 can identify an application identifier from the strings recognized from the input audio signal. The application identifier can correspond to one of the agent applications 110. To identify the application identifier, the NLP component 116 can perform named entity recognition algorithm to the strings recognized from the input audio signal. In using the named entity recognition algorithm, the NLP component 116 can maintain a list of agent identifiers for agent applications 110. The list can include agent identifiers of agent applications 110 installed on the client device 104 that received the input audio signal including the request. By applying the named-entity recognition algorithm, the NLP component 116 can determine that the input audio signal includes the application identifier corresponding to an agent application 110. For example, the NLP component 116 can determine that the input audio signal "Order car with ride sharing service XYZ" includes with an explicit agent application 110 "ride sharing service XYZ." Conversely, by applying the named entity recognition algorithm, the NLP component 116 can determine that the input audio lacks any application identifier corresponding to any of the agent applications 110.

Based on the request, the NLP component 116 can determine whether the request corresponds to a function of the digital assistant application 108 or a function of the agent application 110. To determine, the NLP component 116 can access a list of requests for functions of the digital assistant application 108. The list of requests for the functions of the digital assistant application 108 can be maintained on the data repository 128. The list of requests can include sets of strings for trigger keywords and requests corresponding to the requests predetermined to be associated with functions of the digital assistant application 108. For example, the list can include "take", "show", "search for," and "find," among others. With the identification of the request, the NLP component 116 can compare the request with the list of requests for functions of the digital assistant application 108.

The NLP component 116 can also use the regular expressions 130 maintained on the data repository 128 to determine whether the request corresponds to the function of the digital assistant application 108. The regular expression 130 can define a pattern to match to determine whether the keywords identified from the input audio signal references the at least one function of the digital assistant application 108. The regular expression 130 can also specify which keywords to use to carry out the command indicated in the input audio signal. For example, the regular expression 130 may be of the form {[request], [auxiliary arguments]}. For the keywords of the input audio signal to be determined to reference the functions of the digital assistant application 108, the regular expression 130 can specify that the one or more keywords include a request for the digital assistant application 108 and auxiliary arguments. The regular expression 130 can specify a sequence for the request and the referential keywords in the one or more keywords identified from the input audio signal.

Based on the comparison, the NLP component 116 can determine that the request identified from the input audio signal matches one of the list of requests for functions of the digital assistant application 108. In response to the determination, the NLP component 116 can determine that the request corresponds to one of the functions of the digital assistant application 108. For example, the NLP component 116 can parse the words "What is the weather?" from the input audio signal, and can identify the input audio signal includes a request for weather. The list of requests for the functions of the digital assistant application 108 can specify that the request for weather is one of the functions of the digital assistant application 108. In this example, the NLP component 116 can determine the match between the two requests, and can determine that the request references one of the functions of the digital assistant application 108.

In response to the determination that the request corresponds to the function of the digital assistant application 108, the digital assistant application 108 can execute and fulfill the request identified from the parsing of the input audio signal. In addition, the digital assistant application 108 can execute the request in accordance with the parameter defining the request. For example, the request may be to search for a definition of a word (e.g., "abnegation"). The digital assistant application 108 can perform an internet search to retrieve the definition of the word. In fulfilling the request, the digital assistant application 108 can invoke the response selector component 122. The response selector component 122 can select or identify responses phrases using the policies 134 or the response data 136 maintained on the data repository 128. The policies 134 can be particular to a request, and can specify the response data 136 for the request. The response selector component 122 can search the policies 134 for generating the output using the request type of the response in fulfilling the request. Once the policy 134 is identified, the response selector component 122 can select the response phrase. The response phrase can include a set of strings, such as words or phrases. The digital assistant application 108 can display the response phrase on the display 148 of the client device 104. For example, the digital assistant application 108 can display a content item including the response phrase on a graphical user interface of the digital assistant application 108 on the display 148 of the client device 104.

With the identification of the response phrase, the digital assistant application 108 can invoke and the audio signal generator component 118. The instance of the digital assistant application 108 running on the data processing system 102 or the client device 104 can execute the audio signal generator component 118. Using the selected response phrase, the audio signal generator component 118 can generate an output audio signal. Based on one or more words included in the response phrase, the audio signal generator component 118 can generate the output audio signal. The audio signal generator component 118 can play the output audio signal on the speaker 144 of the client device 104.

Conversely, from the comparison, the NLP component 116 can determine that the request parsed from the input audio signal does not match any of the list of requests for function of the digital assistant application 108. In response to the determination, the NLP component 116 can determine whether the request corresponds to one of the functions of the agent application 110. To determine, the NLP component 116 can access a list of requests for functions of the agent applications 110. The list of requests for functions can be for agent applications 110 installed on the client device 104. The list of requests for the functions of the agent applications 110 can be maintained on the data repository 128. The list of requests can include sets of strings for trigger keywords or requests corresponding to the requests predetermined to be associated with functions of the agent application 110. The NLP component 116 can compare the request with the list of requests for functions of the agent application 110.

From the comparison, the NLP component 116 can determine that the request identified from the input audio signal matches one of the list of requests for functions of the agent application 110. In response to the determination, the NLP component 116 can determine that the request corresponds to one of the functions of the agent application 110. For example, the NLP component 116 can parse the words "Buy me laundry detergent" from the input audio signal, and can identify the input audio signal includes a purchase for detergent. The list of requests for the functions of the agent application 110 can specify that the request for weather is one of the functions of the agent application 110. In this example, the NLP component 116 can determine the match between the two requests, and can determine that the request references one of the functions of the agent application 110, namely the one for such purchases. In addition, the NLP component 116 can determine that the request does not correspond to a function of the digital assistant application 108, in response to determining that the input audio signal includes the application identifier of the agent application 110.

On the other hand, the NLP component 116 can determine that the request does not correspond to any function of any of the agent applications 110 from the comparison. With the determination that the request does not correspond to the digital assistant application 108 or the agent application 110, the response selector component 122 can generate or identify a response phrase indicating that the request does not correspond to any functionality available on the client device 014. For example, the response phrase can include "Sorry, I don't understand your request." The response phrase can be selected from the response data 136 based on the determination. In addition, the audio signal generator component 118 can generate a corresponding output audio signal using the one or more words of the response phrase. The audio signal generator component 118 can play the output audio signal on the speaker 144 of the client device 104.

The instance of the digital assistant application 108 running on the data processing system 102 or the client device 104 can execute the action handler component 120 to generate action data structures based on the determination. The action handler component 120 can execute scripts or programs based on input received from the NLP component 116. The agent service 106 can provide the scripts or programs. The agent service 106 can make the scripts or programs available to the data processing system 102 through an API. The action handler component 120 can determine parameters or responses to input fields and can package the data into an action data structure. The action data structure can be provided to the agent application 110 through the API. The action handler component 120 can transmit the action data structure to the agent service 106 for fulfillment of the request identified from the input audio signal parsed by the NLP component 116.

In response to the determination that the request corresponds to the function of the agent application 110, the action handler component 120 can identify or select an action-inventory 140 from the data repository 128 for the action corresponding to the request. At least one action-inventory 140 can be selected by the action handler component 120 from the set of action-inventories 140 maintained on the data repository 128. The action handler component 120 can use the request identified from the input audio signal to search the data repository 128 for the action-inventory 140. The action handler component 120 can also use the one or more parameters identified from the input audio signal to search the data repository 128 for the action-inventory 140. The action handler component 120 can traverse through the set of action-inventories 140 maintained on the data repository 128. For each action-inventory 140, the action handler component 120 can identify the request identifier of the action-inventory 140.

The action handler component 120 can compare the request identified from the input audio signal with the request identifier of the action-inventory 140. The comparison of the request identifier from the input audio signal and the request identifier of the action-inventory 140 can be in accordance with a semantic knowledge graph. The action handler component 120 can invoke the NLP component 116 to determine whether the request is semantically related with the request identifier using the semantic knowledge graph. The semantic knowledge graph can include a set of nodes and edges. Each node can correspond to one or more words or a phrase. Each edge can define a semantic distance between a pair of words indicated by the corresponding words on the nodes. From the semantic knowledge graph, the NLP component 116 can identify the node corresponding to the request, the node corresponding to the request identifier, and the semantic distance indicated in the pair of nodes. The NLP component 116 can compare the semantic distance to a threshold distance. When the semantic distance is determined to not satisfy the threshold distance (e.g., greater than), the NLP component 116 can determine that the request does not match the request identifier of the action-inventory 140. On the other hand, when the semantic distance is determined to satisfy the threshold distance (e.g., less than or equal to), the NLP component 116 can determine that the request does match the request identifier of the action-inventory 140. From the comparison, the action handler component 120 can determine that the request does not match the request identifier of the action-inventory 140. In response to the determination, the action handler component 120 can identify the next action-inventory 140 in the set maintained on the data repository 128 and can repeat the comparison.

Conversely, from the comparison, the action handler component 120 can determine that the request matches the request identifier of the action-inventory 140. In response to the determination, the action handler component 120 can select the action-inventory 140 for the action corresponding to the request. As multiple requests may correspond to the same action-inventory 140 as discussed above, the action handler component 120 can select the action-inventory 140 that was or is to be selected for another request. The action handler component 120 can also compare the one or more parameters identified from the input audio signal with the input variables of the action-inventory 140, prior to selection of the action-inventory 140. The action handler component 120 can identify the input variables from the parameter mapping or the address template of the action-inventory 140. The action handler component 120 can exclude the auxiliary parameters as indicated in the action-inventory 140 in comparing the identified parameters with the input variables of the action-inventory 140. The action handler component 120 can determine that the identified parameters match the input variables of the action-inventory 140 in accordance to the set of permitted values for each input variable. In response to the determination, the action handler component 120 can select the action-inventory 140 for the action corresponding to the request defined by the one or more parameters. The action handler component 120 can also halt the traversal of the set of action-inventories 140 in the data repository 128. Otherwise, the action handler component 120 can determine that the identified parameters do not match the input variables of the action-inventory 140. The action handler component 120 can identify another action-inventory 140 for the action corresponding to the same request, and can repeat the comparison. Upon comparing with all the action-inventories 140, the action handler component 120 can determine that the identified parameters do not match the input variables in any of the action-inventories 140 of the agent application 110. In response to the determination, the action handler component 120 can select the preset action-inventory 140 for the agent application 110 to respond to the request.

The action handler component 120 can also use the agent identifier identified from the input audio signal to search the data repository 128 for the action-inventory 140. Prior to searching using the request, the action handler component 120 can identify a subset of the action-inventories 140 with the application identifier matching the agent identifier. The agent identifier can correspond to one of the agent applications 110. Each action-inventory 140 of the identify subset can include the application identifier that is determined to match the agent identifier identified from the input audio signal. To identify the subset, the action handler component 120 can compare the agent identifier with the application identifier of each action-inventory 140. When the agent identifier is determined to match the application identifier of the action-inventory 140, the action handler component 120 can include the action-inventory 140 into the subset. Otherwise, when the agent identifier is determined to not match to the application identifier of the action-inventory 140, the action handler component 120 can exclude the action-inventory 140 from the subset. The action handler component 120 can traverse through the identified subset of action-inventories 140 for the application identifier using the request to select the action-inventory 140 for the action corresponding to the request.

When the input audio signal is determined to lack an agent identifier, the action handler component 120 can select the action-inventory 140 from the set maintained on the data repository 128 based on the request, the one or more parameters, and an agent usage history. The agent usage history can indicate usage statistics of the agent application 110 on the client device 104 running the digital assistant application 108 from which the input audio signal is received. The agent usage history can also indicate functions of the agent application 110 invoked on the client device 104. The agent usage history can be limited to a defined time window prior to the request identified from the input audio signal detected on the client device 104. The action handler component 120 can identify a subset of action-inventories 140 with request identifiers matching the request and the one or more parameters. The subset can include the action-inventories 140 with different application identifiers corresponding to multiple agent applications 110. The action handler component 120 can use the agent usage history for the client device 104 to select the action-inventory 140 from the subset. The action handler component 120 can identify at least one agent identifier from the agent usage history. The action handler component 120 can compare the agent identifier with application identifier of each action-inventory 140 in the identified subset. The action handler component 120 can determine that application identifier of the action-inventory 140 matches the agent identifier from the agent usage history from the comparison. In response to the determination, the action handler component 120 can select the action-inventory 140 for the action to be executed by the agent application 110 in accordance with the parameter. Conversely, the action handler component 120 can determine that the application identifier of the action-inventory 140 does not match the agent identifier from the agent usage history from the comparison. In response to the determination, the action handler component 120 can identify another action-inventory 140 and can repeat the comparison using the agent identifier.

With the identification of the action-inventory 140, the action handler component 120 can validate the one or more parameters identified from the input audio signal against the address template of the action-inventory 140. The validation by the action handler component 120 may be to check whether there are prerequisite parameters as specified by the action-inventory 140 to carry out the action corresponding to the request. For example, for a ridesharing request, the action handler component 120 can check whether there is a parameter corresponding to the destination as parsed from the input audio signal. The action handler component 120 can use the parameter mapping for the address template of the action-inventory 140 in validating the parameters. The action handler component 120 can identify the correspondences between parameters and input variables defined in the mapping for the action-inventory 140. The action handler component 120 can identify a subset of correspondences for input variables not specified as auxiliary by the mapping of the action-inventory 140 for the address template.

From each input variable not indicated as auxiliary, the action handler component 120 can determine whether at least one of the parameters corresponds to the input variable as specified by the mapping. The determination of the correspondence can be performed using semantic analysis algorithms as provided by the NLP component 116 (e.g., semantic knowledge graph). For each input variable, the action handler component 120 can invoke the NLP component 116 to determine whether the input variable corresponds to any of the parameters, or vice-versa. In response to determination that all the input variables corresponds to at least one parameter, the action handler component 120 can determine that the parameters are successfully validated. The action handler component 120 can also continue to use the address template of the action-inventory 140 to generate an address to fulfill the action corresponding to the request.

On the other hand, in response to the determination that at least one input variable (not indicated as auxiliary) does not correspond to any parameter, the action handler component 120 can determine that the parameters are not successfully validated. The action handler component 120 can cease or terminate further processing of the request and the parameters (e.g., generation of an address using the address template of the action-inventory 140). The action handler component 120 can detect or determine an error in validating the one or more parameters identified from the input audio signal. The digital assistant application 108 can present an indication (e.g., using a visual content item or audio) that the request is invalid or unsuccessful. The action handler component 120 can provide an indication of the error to the agent service 106 or an administrator for the agent application 110 associated with the action-inventory 140.

Upon identifying the action-inventory 140, the action handler component 120 can determine whether the client device 104 is authenticated with the agent application 110 associated with the action-inventory 140. The action handler component 120 can identify the agent application 110 associated with the action-inventory 140. Once identified, the action handler component 120 can check an authentication status of the client device 104 with the agent application 110. The checking of the authentication status can be performed using an account identifier of the client device 104 or the digital assistant application 108. The action handler component 120 can send a request for the authentication status to the agent service 106 managing resources of the agent application 110. The request can include the account identifier of the client device 104 or of the digital assistant application 108. The agent service 106 can provide a response to the action handler component 120 indicating whether the client device 104 is authenticated with the agent application 110. When the response indicates that the client device 104 is authenticated, the action handler component 120 can determine that the client device 104 is authenticated with the agent application 110. The action handler component 120 can also continue processing the request. On the other hand, when the response indicates that the client device 104 is not authenticated, the action handler component 120 can determine that the client device 104 is not authenticated with the agent application 110. The action handler component 120 can cease or terminate further processing of the request (e.g., generation of an address using the address template of the action-inventory 140). The digital assistant application 108 can also present an indication to authenticate with the agent application 110 to carry out the action corresponding to the request. For example, the digital assistant application 108 can render a prompt for logging into the agent application 110 on the display 148 of the client device 104. The prompt can include a field for an account identifier of the user and the passcode.

In addition, the action handler component 120 can also determine whether the agent application 110 associated with the action-inventory 140 is installed on the client device 104. The action handler component 120 can identify the agent application 110 associated with the action-inventory 140. Once identified, the action handler component 120 can access the client device 104 to determine whether the agent application 110 is installed on the client device 104. For example, the action handler component 120 can access a list of installed applications on the client device 104 to determine whether the agent application 110 is installed. The action handler component 120 can check the application identifier or the agent identifier to the list. In response to the determination that the agent application 110 is installed, the action handler component 120 can continue to process the request. On the other hand, in response to the determination that the agent application 110 is not installed, the action handler component 120 can terminate processing of the request (e.g., generation of an address using the address template of the action-inventory 140). The digital assistant application 108 can also present an indication to install the agent application 110 to carry out the action corresponding to the request. For example, the digital assistant application 108 can render a prompt indicating that the corresponding agent application 110 is not installed on the display 148 of the client device 104. The prompt can also include a link to install the agent application 110.

The action-inventory 140 selected by the action handler component 120 can correspond to the agent application 110 not running as one of applications in the foreground process 150 or the non-foreground process 152. For example, the action-inventory 140 can correspond to the agent application 110 installed on the client device 104, but not running on the client device 104. The action-inventory 140 selected by the action handler component 120 can correspond to the agent application 110 running in the non-foreground process 152. For example, another application (e.g., another agent application 110 or the digital assistant application 108) can be running in an application of the foreground process 150. The application in the foreground process 150 can have a graphical user interface rendered on at least a portion of the display 148 of the client device 104. In contrast, the application running in the non-foreground process 152 can lack a graphical user interface rendered on the display 148 of the client device 104, and can execute routines (e.g., the action). In addition, the action-inventory 140 selected by the action handler component 120 can correspond to the agent application 110 running in the foreground process 150. For example, the agent application 110 corresponding to the action-inventory 140 can have a graphical user interface currently rendered on the display 148 of the client device 104.

The action handler component 120 can generate an address in accordance with the address template of the action-inventory 140. The action handler component 120 can identify the address template of the action-inventory 140 selected from the set maintained on the data repository 128. As described above, the address template of the action-inventory 140 can include: a first portion referencing the agent application 110; and a second portion referencing the action to be performed and the one or more input variable used to execute the action. For example, the address template can be a URI template. The first portion can include a scheme referencing the agent application 110 or a hostname referencing the agent service 106 or the agent application 110. The second portion can include a pathname referencing the action and one or more query strings corresponding to one or more input variable sin the URI. For example, the address template of the action-inventory 140 can be "https://ex_personalmetrics. example.com/checksteps{?username}" for a request to check a number of steps taken. The first portion can correspond to "https://ex_personalmetrics.example.com/" and the second portion can correspond to "checksteps{?username}."

The address generated in accordance with the address template can include a first substring and a second substring. The first substring of the generated address can correspond to the first portion of the address template. The generated address can be a portion of the URI, and the first substring can include the scheme referencing the agent application 110 or the hostname referencing the agent service 106 or the agent application 110. The scheme and the hostname can be taken by the action handler component 120 from the first portion of the address template. The second substring of the generated address can correspond to the second portion of the second template. The generated address can also be a portion of the URI, and the second substring can include the pathname referencing the action to be executed by the agent application 110 and query strings including the parameters identified from the input audio signal. For example, the address generated in accordance with the address template can be "https://ex_personalmetrics.example.com/checksteps?username=example_user_id." The first substring of the address can include "https://ex_personalmetrics.example.com" and the second substring of the address can include "checksteps?username=example_user_id."

In generating the address, the action handler component 120 can use or set the first portion of the address template as a first substring of the address to reference the agent service 106 or the agent application 110 associated with the agent service 106. The action handler component 120 can use the second portion of the address template as a second substring of the address to correspond to the action and the parameters used to execute the action. The action handler component 120 can populate the input variables of the second portion of the address template with the one or more parameters identified from the input audio signal.

The action handler component 120 can populate in accordance with the parameter mapping of the action-inventory 140 defined for the address template. As discussed above, the parameter mapping can define a correspondence between the input variables of the second portion and words to be identified from parsing input audio signals. The action handler component 120 can use the parameters as the words identified from the input audio signal to insert into the second portion of the address template in populating the input variables. The population or of the second portion of the address template can be in accordance with expression expansion in URI templates. For each input variable specified in the address template, the action handler component 120 can identify the corresponding parameters as specified by the mapping of the action-inventory 140. With the identification, the action handler component 120 can insert, replace, or set the query string with a name of the input variable and the identified parameter. For example, the input variable may be "{?username}" in the address template and the parameter identified may be "example_user_id". In this example, the action handler component 120 can replace with "?username=example_user_id" in the second substring of the address in accordance with expression expansion for URI templates.

In populating the input variables of the address template, the action handler component 120 can determine whether the input variable is an auxiliary as specified in the mapping for the address template of the action-inventory 140. In response to the determination that the input variable is auxiliary, the action handler component 120 can also determine whether there is an identified parameter that corresponds to the auxiliary input variable. When there is determined to be no parameters that correspond to the auxiliary input variable, the action handler component 120 can omit or remove the in auxiliary input variable from the address. The generated address can thus lack one or more parameters corresponding to auxiliary input variables in the address template. Otherwise, when there is determined to be a parameter that corresponds to the auxiliary input variable, the action handler component 120 can insert or populate the auxiliary input variable with the parameter. Conversely, in response to the determination that the input variable is not auxiliary, the action handler component 120 can identify a parameter from the identified parameters to include into the input variable.

With the generation of the address in accordance with the address template, the action handler component 120 can validate the address. The validation of the address by the action handler component 120 may be to check whether the address is well-formed. To validate, the action handler component 120 can check the address against a regular expression 130 for addresses (e.g., URIs or URLs). The regular expression 130 for addresses can include, for example, schema, hostnames, pathnames, and query strings separated by delimiters for valid addresses. The action handler component 120 can compare the address against the regular expression 130 to determine whether the address matches the pattern for addresses as specified by the regular expression 130. In response to the determination that the address matches, the action handler component 120 can determine that the generated address is successfully validated.

Conversely, in response to the determination that the address does not match, the action handler component 120 can determine that the generated address is not successfully validated. Based on the determination, the action handler component 120 can also detect an error in validating the generated address. The error can indicate that the address is not well-formed. Furthermore, the action handler component 120 can cease or terminate further processing of the address (e.g., generating an action data structure). The action handler component 120 can provide an indication of the error to the agent service 106 or an administrator for the agent application 110 associated with the action-inventory 140.

The action handler component 120 can package or generate an action data structure using the address for executing the action. The generation of the action data structure can be in accordance with an application programming interface (API). For example, the API can be specified by an operating system running on the client device 104, and can be used by both the digital assistant application 108 and the agent application 110. The action data structure can be passed between the digital assistant application 108 and the agent application 110 via the API. The generation of the action data structure can be in accordance with the Hypertext Transfer Protocol (HTTP). For example, the action data structure generated by the action handler component 120 can be an HTTP request (e.g., GET or POST functions). The action data structure can include at least one header and at least one body. The header can include a device modality (e.g., a smartphone, smart speaker, tablet, laptop, and desktop) of the client device 104 executing the digital assistant application 108 and the agent application 110. The header can include a source address set to the client device 104. The header can include the generated address set a destination address. The body of the action data structure can include other information related to the request identified from parsing the input audio signal. For example, the body can include an identifier referencing the digital assistant application 108 or the client device 104 running the digital assistant application 108.

The instance of the digital assistant application 108 on the data processing system 102 or the client device 104 can execute the agent interface component 126 to provide the action data structure to the agent application 110. With the generation of the action data structure, the agent interface component 126 can provide or direct the action data to the agent application 110. The agent interface component 126 can transmit the action data structure over the network 114 to the agent service 106 managing resources for the agent application 110 (e.g., as an HTTP request). For example, an HTTP request corresponding to the action data structure can be transmitted by the agent interface component 126 over the network 114. The agent interface component 126 can invoke the agent application 110 using the action data structure (e.g., via the API). For example, the agent interface component 126 can make a function call to invoke the agent application 110 in accordance to an API and facilitated by the operating system of the client device 104. In invoking, the agent interface component 126 can pass the action data structure to the agent application 110. In invoking, the agent interface component 126 can pass the action data structure to the agent application 110.

The data processing system 102, the client device 104, or the agent service 106 can execute an instance of the agent application 110. As the destination address of the data structure can reference the agent application 110 or the agent service 106, the agent application 110 can receive the action data structure from the agent interface component 126. For example, the action data structure may have been sent via the network 114, and can the destination address can include the hostname referencing the agent application 110 or the agent service 106. Since the destination address of the action data structure references the agent application 110 or the agent service 106, the action data structure can be routed to the agent application 110 or the agent service 106 by the network 114. In another example, the destination address of the action data structure can be a deep link with a scheme referencing the agent application 110. By invoking the destination address, the action data structure can be directed by the client device 104 or the network 114 to the agent application 110 referenced by the scheme.

Upon passing of the action data structure, the agent application 110 can parse the action data structure to identify the address. The identification of the address can be from the destination address header of the action data structure. The agent application 110 can parse the address to identify the first substring of the address referencing the agent application 110 itself or the agent service 106 managing resources for the agent application 110. The agent application 110 can parse the address the second substring of the address. The agent application 110 can further parser the second substring of the address to identify the action and the one or more parameters used to perform the action. The agent application 110 can parse the pathname of the URI to identify the action and parse the one or more query strings to identify the one or more parameters used to execute the action. For example, the agent application 110 can parse the address "https://ex_personalmetrics.example.com/checksteps?username=example_user_id" to identify the second substring "checksteps?username=example_user_id." The agent application 110 can further identify "checksteps" as a request to get a number of steps measured and the "Example_user_id" as the name of the user whose steps were measured. With the identification, the agent application 110 can perform, carry out, or execute the action in accordance with the one or more parameters. Using the previous example, the agent application 110 can perform the series of processes and routines to retrieve the number of steps taken by the user of the agent application 110 with the account identifier "example_user_id." The agent application 110 can provide the output of the execution of the action to the agent interface component 126.

The agent application 110 can also generate an output to indicate whether the execution of the action is successful or a failure to send to the digital assistant application 108. In executing the agent, the agent application 110 can fail in completing the action or terminate short of completion. For example, while processing the request for number of steps, the agent service 106 can determine that the information on the number of steps taken by the corresponding user cannot be retrieved. Based on the determination, the agent application 110 can create the output indicating the failure. In response to the failure, the agent application 110 can generate the output indicating failure. Conversely, the agent application 110 can complete the execution of the action. In response to the completion, the agent application 110 can generate the output indicating success. The agent application 110 can provide the output of the execution of the action to the agent interface component 126.

In conjunction with the passing of the action data structure, the agent interface component 126 can control whether the agent application 110 is to be run as the non-foreground process 152 or the foreground process 150. The setting or controlling of the foreground process 150 or the non-foreground process 152 can be based on the interface mode indicator of the action-inventory 140 used to generate the action data structure. The setting of the foreground process 150 and the non-foreground process 152 by the agent interface component 126 can be facilitated by that operating system running on the client device 104. As discussed above, the agent application 110 can be running as one the applications in the foreground process 150 or the non-foreground process 152, or neither the foreground process 150 nor the non-foreground process 152. With the passing of the action data structure, the agent interface component 126 can control whether the agent application 110 is to be set from the non-foreground process 152 to the foreground process 150.

Furthermore, the agent interface component 126 can identify which applications are running in the foreground process 150 and as the non-foreground process 152, such as the digital assistant application 108 and the agent applications 110 installed on the client device 104. For example, the agent interface component 126 can access the operating system of the client device 104 to identify applications running as the foreground process 150 and applications running in the non-foreground process 152. The agent interface component 126 can identify whether the agent application 110 (or other applications on the client device 104) is one of the foreground process 150 or the non-foreground process 152. The agent interface component 126 can identify the agent application 110 as running as one of the applications in the foreground process 150. The agent interface component 126 can identify the agent application 110 as running as one of the applications in the non-foreground process 152. The agent interface component 126 can identify the agent application 110 as running as one of the applications neither in the foreground process 150 nor the non-foreground process 152. In response to determining that the agent application 110 is running neither as the foreground process 150 nor the non-foreground process 152, the agent interface component 126 can cause the client device 104 to initiate execution of the agent application 110.

From the selected action-inventory 140, the agent interface component 126 can identify the interface mode indicator. The interface mode indicator can specify the user interface component 142 of the agent application 110 is to be rendered on the display 148 of the client device 104 in executing the action corresponding to the action-inventory 140. When the interface mode indicator specifies that no user interface component 142 is to be rendered, the agent interface component 126 can set the agent application 110 as the foreground process 150. When the agent application 110 is identified as not executing on the client device 104, the agent interface component 126 can launch the agent application 110 in the foreground process 150. When the agent application 110 is identified as running in the non-foreground process 152, the agent interface component 126 can remove the application originally in the foreground process 150 (e.g., another agent application 110 or the digital assistant application 108) and set to the non-foreground process 152. In addition, the agent handler component 126 can set the agent application 110 from the non-foreground process 152 to the foreground process 150. When the agent application 110 is identified as already in the foreground process 150, the agent interface component 126 can maintain the agent application 110 in the foreground process 150.

When the interface mode indicator specifies that a user interface component 142 is to be rendered, the agent interface component 126 can apply at least one authorization policy of the agent application 110. The authorization policy can specify for which applications the output of the agent application 110 is restricted or permitted to be presented with. For example, the authorization policy for one personal fitness application can specify that the output is to be restricted from being presented with another personal fitness application. The authorization policy can include a list of application (also referred herein a blacklist) for which the output of the agent application 110 is restricted from concurrent presentation. The authorization policy can also include a list of application (also referred herein as a whitelist) for which the output of the agent application 110 is permitted for concurrent presentation. Each list can include agent identifiers (e.g., application file names) corresponding to the included applications. The authorization policy can be specific to an output type of the agent application 110. The output type can depend on the request identified from parsing the input audio signal. For example, the authorization policy can restrict displays of a number of steps while another personal fitness application is in the foreground but can permit displays of account credential information.

The determination of whether to apply the authorization policy can be based on whether the agent application 110 is running in the foreground process 150 or the non-foreground process 152. When the agent application 110 is identified as in the foreground process 150, the agent interface component 126 can determine not to apply the authorization policy. The agent interface component 126 can also permit the user interface component 142 of the agent application 110 with the output to be rendered in the display 148 of the client device 104. When another application besides agent application 110 is identified as running in the foreground process 150, the agent interface component 126 can determine to apply the authorization policy. In this manner, the agent application 110 can remain as part of the non-foreground process 152 or not executing on the client device 104. In determining whether to apply, the agent interface component 126 can also identify the authorization policy based on the request parsed from the input audio signal. The agent interface component 126 can compare the identified request with the output type for the authorization policy. Upon determining a match, the agent interface component 126 can determine to apply the authorization policy specified for the corresponding output type.

In accordance with the authorization policy, the agent interface component 126 can determine whether the output of the agent application 110 is authorized to be presented with the graphical user interface component of the application in the foreground process 150. The agent interface component 126 can identify the application in the foreground process 150. The agent interface component 126 can identify the agent identifier of the application in the foreground process 150. The agent interface component 126 can compare the application with the lists of application specified in the authorization policy of the agent application 110. In comparing, the agent interface component 126 can use the identified agent identifier to search both the whitelist and the blacklist of the authorization policy for the agent application 110. If the application in the foreground process 150 matches one of the applications in the whitelist, the agent interface component 126 can determine to permit the output of the agent application 110 to be presented with the application. On the other hand, if the application in the foreground process 150 matches one of the applications in the blacklist, the agent interface component 126 can determine to restrict the output from being presented with the application.

When the output of the agent application 110 is determined to be permitted, the agent interface component 126 can identify the user interface component 142 of the agent application 110. To identify the user interface component 142, the agent interface component 126 can use the address generated in accordance with the address template of the action-inventory 140. For example, the address generated in accordance with the address template can reference both the action to be executed by the agent application 110 and the user interface component 142 to be rendered in carrying out the action. The address generated in accordance with the address template can reference the agent application 110 or the agent service 106 managing resources for the agent application 110. The agent interface component 126 can identify a separate address or identifier for the user interface component 142 from the action-inventory 140. The address can reference the user interface component 142 maintained by the agent service 106. The address and identifier can reference the user interface component 142 maintained on the data repository 128. Using the separate address or identifier, the agent interface component 126 can identify the user interface component 142 to be rendered in conjunction with the execution of the action by the agent application 110.

Upon identifying, the agent interface component 126 can access or retrieve the user interface component 142. Using the address generated according to the address template of the action-inventory 140, the agent interface component 126 can retrieve the user interface component 142. The agent interface component 126 can send a request for the user interface component 142 to the agent service 106 including the address. As the address references the agent service 106, the request can be directed to the agent service 106 handling resources for the agent application 110. The agent service 106 in turn can provide a response with the referenced user interface component 142 to the agent interface component 126. Using the address included in the action-inventory 140, the agent interface component 126 can retrieve the user interface component 142. The address included in the action-inventory 140 can be separate from the address generated using the address template, and can reference the agent service 106 or the data repository 128. The agent interface component 126 can send a request for the user interface component 142 including the address. When the address references the agent service 106, the request can be directed to the agent service 106 handling resources for the agent application 110. When the address references the data repository 128, the request can be directed to the data repository 128. The agent service 106 or the data repository 128 in turn can provide a response with the referenced user interface component 142 to the agent interface component 126. Using the identifier included in the action-inventory 140, the agent interface component 126 can retrieve the user interface component 142 from the data repository 128. The identifier can correspond to an index of the user interface component 142 maintained on the data repository 128. The agent interface component 126 can search the data repository 128 using the identifier to find the user interface component 142. Once identified, the agent interface component 126 can retrieve the user interface component 142 from the data repository 128.

Prior to rendering the user interface component 142, the agent interface component 126 can also apply an authorization policy of the application in the foreground process 150. The authorization policy can specify which applications the graphical user interface component of the agent in the foreground process 150 is restricted or permitted to be presented with. For example, the authorization policy for one banking application can specify that the output is to be restricted from being presented with another banking application. The authorization policy can include a list of application (also referred herein a blacklist) for which the graphical user interface of the application in the foreground process 150 is restricted from concurrent presentation. The authorization policy can also include a list of application (also referred herein as a whitelist) for which the graphical user interface of the application in the foreground process 150 is permitted for concurrent presentation. Each list can include agent identifiers (e.g., application file names) corresponding to the included applications.

In accordance with the authorization policy, the agent interface component 126 can determine whether the graphical user interface component of the application in the foreground process 150 is authorized to be presented with the output of the agent application 110. The agent interface component 126 can identify the agent application 110 executing the action. The agent interface component 126 can identify the agent identifier of the agent application 110. The agent interface component 126 can compare the application with the lists of application specified in the authorization policy of the application in the foreground process 150. In comparing, the agent interface component 126 can use the identified agent identifier to search both the whitelist and the blacklist of the authorization policy for the application in the foreground process 150. If the agent application 110 matches one of the applications in the whitelist, the agent interface component 126 can determine to permit concurrent presentation with the graphical user interface of the application in the foreground 150. On the other hand, if the agent application 110 matches one of the application in the blacklist, the agent interface component 126 can determine to restrict the concurrent presentation.

With the identification of the user interface component 142, the agent interface component 126 can render the user interface component 142 of the agent application 110 in the display 148 of the client device 104. With the determination that concurrent presentation is permitted, the user interface component 142 of the agent application 110 can be rendered on the display 148 concurrent with the graphical user interface of the application running in the foreground process 150. The agent interface component 126 can render the user interface component 142 as an overlay superimposed on the graphical user interface of the application in the foreground process 150. The agent interface component 126 can also include the user interface component 142 as a portion of the graphical user interface of the application in the foreground process 150. For example, the application running as the foreground process 150 can be the digital assistant application 108, and can have a graphical user interface including a dialog with the user operating the digital assistant application 108 on the client device 104. The agent interface component 126 can insert the user interface component 142 in the dialog of the graphical user interface of the digital assistant application 108.

The agent interface component 126 can add or insert information into the user interface component 142 rendered on the display 148 of the client device 104. The agent interface component 126 can add, insert, or include the words or the request from the input audio signal into a corresponding interface element of the user interface component 142. The words or the request can be identified by the NLP component 116 from parsing the input audio signal. For example, the agent interface component 126 can incorporate the words with the request onto a textbox of the user interface component 142. The agent interface component 126 can retrieve, receive, or identify the output generated by the agent application 110. The agent interface component 126 can withhold the rendering of the user interface component 142 and can wait for the output from the agent application 110. Upon receipt of the output from the agent application 110, the agent interface component 126 can add, insert, or include the output into a corresponding interface element of the user interface component 142. For example, the agent interface component 126 can receive an output indicating the number of steps taken by the user of the agent application 110 installed on the client device 104. The agent interface component 126 can insert the number of steps into another textbox of the user interface component 142. With the receipt and insertion of the output, the agent interface component 126 can render the user interface component 142 on the display 148.

As the user interface component 142 is rendered on the display 148 along with the graphical user interface of the application in the foreground process 150, the agent interface component 126 can monitor for user interaction events with the user interface component 142. The user interaction events can include, for example, hover-overs, clicks, scrolling, flicking, keypresses, and touch screens, among others. Upon detecting a user interaction event on the user interface component 142, the agent interface component 126 can process the user interaction event to update the user interface component 142. The agent interface component 126 can relay the detected user interaction event to the agent application 110. The agent application 110 can process the user interaction event (e.g., using an event handler) and can generate another output in response to the user interaction event. The agent application 110 can provide the output to the agent interface component 126. Using the output received from the agent application 110, the agent interface component 126 can update the user interface component 142.

In this manner, the agent interface component 126 can maintain the application originally in the foreground process 150, while adding a user interface component 142 from the agent application 110 for display as an overlay. The agent interface component 126 can have both the original application as well as the agent application 110 both as applications in the foreground process 150. The agent interface component 126 can also maintain visual components from both applications rendered on the display 148 of the client device 104, thereby reducing user of the client device 104 to perform context switching. By keeping both, the agent interface component 459 can also reduce computing resources incurred from switching the rendering and between the foreground process 150 and the non-foreground process 152.

Conversely, when the output of the agent application 110 is determined to be restricted, the agent interface component 126 can set the agent application 110 as the foreground process 150. When the agent application 110 is identified as not running on the client device 104, the agent interface component 126 can invoke and launch the agent application 110 (e.g., via a the operating system of the client device 104). The agent interface component 126 can move the application originally running as the foreground process 150 and can set the application as running as the non-foreground process 152. In switching the foreground process 150 and the non-foreground process 152, the agent interface component 126 can remove the graphical user interface component of the application originally in the foreground process 150 from being rendered on the display 148. In addition, the agent interface component 126 can invoke the agent application 110 using the action data structure generated by the action handler component 120. Instead of rendering the user interface component 142, the agent interface component 126 can render the graphical user interface of the agent application 110 on the display 148 of the client device 104.

Running as the foreground process 150, the agent application 110 can display the output of the action indicated in the address of the action data structure on the graphical user interface rendered in the display 148. The agent application 110 can monitor for user interaction events with the graphical user interface. Upon detecting a user interaction event on the user interface component 142, the agent application 110 can process the user interaction event (e.g., using an event handler) and can generate another output in response to the user interaction event. The agent application 110 can update the graphical user interface rendered in the display 148 of the client device 104 using the generated output.

By controlling the switching between the foreground process 150 and the non-foreground process 152, the user involvement to search for the agent application 110 may be eliminated, thereby improving the HCI with the applications on the client device 104. In addition, the digital assistant application 108 can regulate and reduce consumption of computing resources on the client device 104 from the switching.

Figure 2:
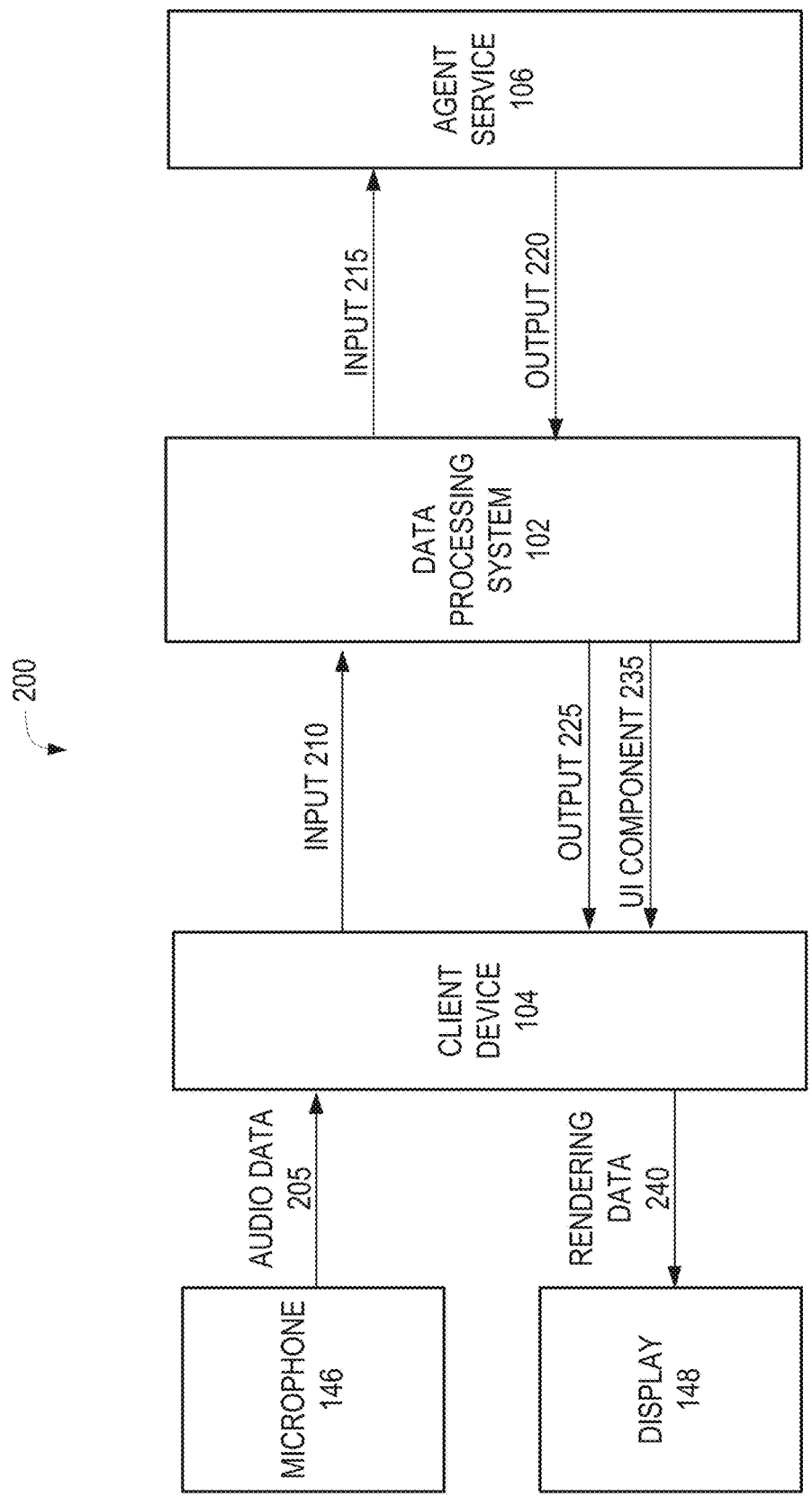
FIG. 2 illustrates a sequence diagram of an example data flow to render visual components on applications in response to voice input commands in the system illustrated in FIG. 1, in accordance with an example of the present disclosure.

FIG. 2 depicts a sequence diagram of an example data flow 200 to rendering visual components on applications in the system 100 illustrated in FIG. 1. The data flow 200 can be implemented or performed by the system 100 described above in conjunction with FIG. 1 or system 500 detailed below in conjunction with FIG. 5. The data flow 200 an include communications in the form of packets (e.g., HTTP messages) among the microphone 150, the client device 104, the data processing system 102, the agent service 106 via the network 114, and the display 148.

A local instance of the digital assistant application 108 running on the client device 104 can receive audio data 205 (e.g., the input audio signal) from a microphone 146 communicatively coupled with the client device 104. The digital assistant application 108 can execute on the client device 104 in the non-foreground process 152, without any visual component rendered on the display 148. The client device 104 can have another application in the foreground process 150, with a graphical user interface rendered on the display 148. The digital assistant application 108 on the client device 104 can perform initial processing (e.g., automated speech recognition) on the audio data 205 to identify one or more words from the audio data 205. The digital assistant application 108 can provide the one or more recognized words from the audio data 205 as an input 210 to a remote instance of the digital assistant application 108 running on the data processing system 102. The NLP component 116 on the data processing system 102 in turn can further process the one or more words of the input 210 to identify a request and one or more parameters. The request can indicate an action to be performed by the agent application 110 in accordance with the one or more parameters.

The action handler component 120 on the data processing system 102 can identify an action-inventory 140 from the data repository 128 using the request and the one or more parameters. The agent application 110 associated with the identified action-inventory 140 can be not executing on the client device 104 or can be running as one of the applications of the non-foreground process 152. The action handler component 120 can generate an address in accordance with an address template of the identified action-inventory 140. The address can include a first substring (e.g., a scheme or hostname) referencing the agent application that is to carry out the action. The address can additionally include a second string corresponding to the action to be executed and the one or more parameters in accordance to which the action is to be executed. The action handler component 120 can package the address into an action data structure to provide as an input 215 to the agent service 106 for the agent application 110.

Upon receipt of the input 215, the agent service 106 for the agent application 110 can parse the action data structure to identify the first substring and the second substring. As the input is processed, the client device 104 can maintain applications in running as the foreground process 150 and as the non-foreground process 152. The agent application 110 executing on the agent service 106 can further parse the second sub string to identify the action and the one or more parameters. With the identification, the agent application 110 can execute the action in accordance with the parameters. In executing the action, the agent application 110 can generate an output 220 to provide to the client device 104 via the data processing system 102. The agent service 106 can provide the output 220 to the data processing system 102. The digital assistant application 108 on the data processing system 102 can send the output 220 as an output 225 to the client device 104.

In conjunction, the agent interface component 126 can determine that the action-inventory 140 specifies that a user interface component 142 is to be rendered in carrying out the action. In response to the determination, the agent interface component 126 can identify a user interface component 235 (e.g., using the address generated using the address template of the action-inventory 140) from the set of user interface components 142. The agent interface component 126 can provide the user interface component 235 to the client device 104. Using the user interface component 235, the client device 104 can display rendering data 240 for the display 148 of the client device 104. The rendering data 240 can include the user interface component 235 as an overlay superimposed on the graphical user interface of the application in the foreground process 150. The client device 104 can maintain the applications in the foreground process 150 and the non-foreground process 152 prior to the receipt of the audio data 205 from the microphone 146.

Figure 3:
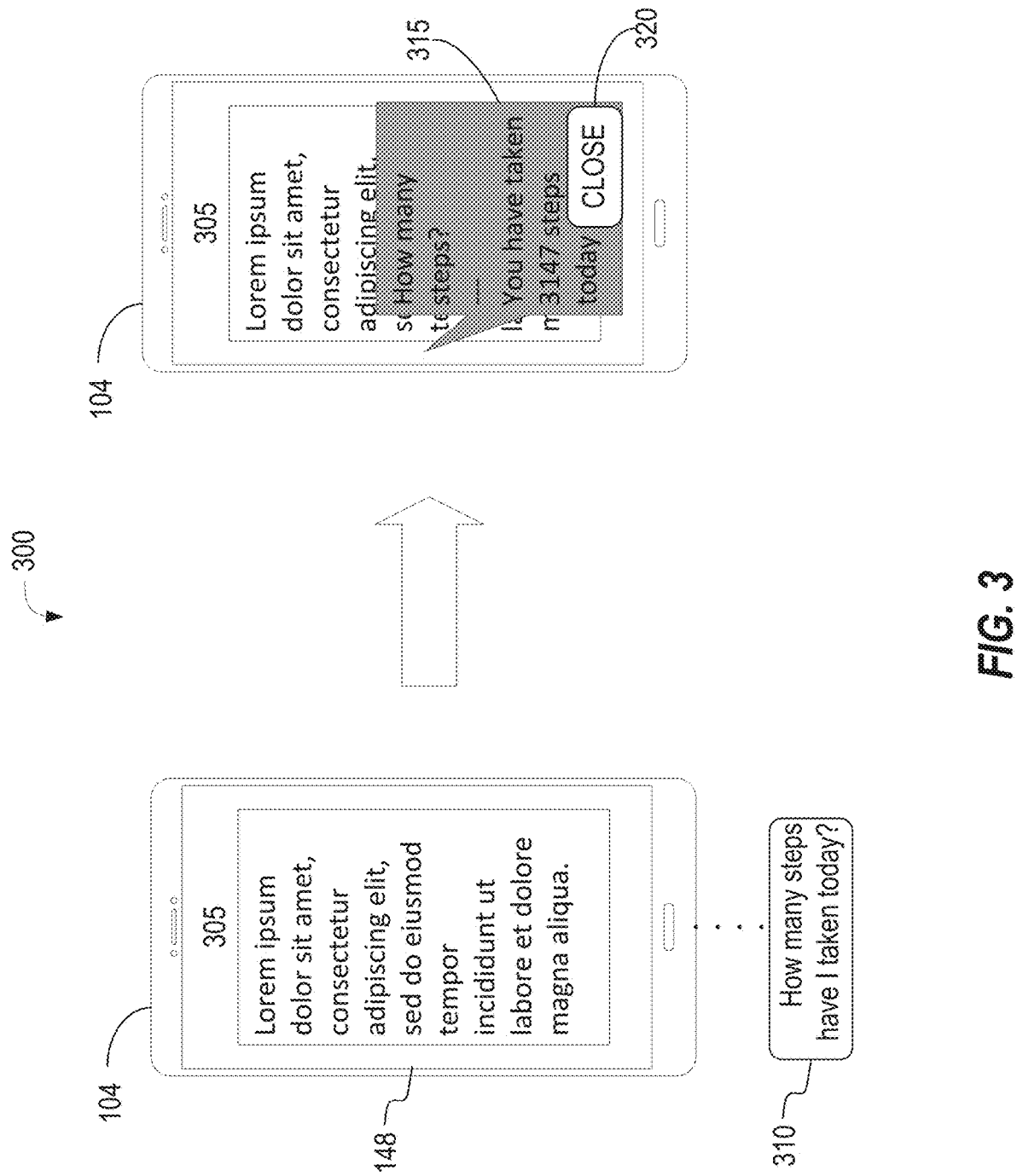
FIG. 3 illustrates a use case diagram of an example client device displaying input messages and generating addresses in the system illustrated in FIG. 1, in accordance with an example of the present disclosure.

FIG. 3 illustrates a use case diagram of an example client device 104 displaying input messages and providing user interface components in the system 100 illustrated in FIG. 1. The client device 104 can have an application running as the foreground process 150 and a local instance of the digital assistant application 108 running as the non-foreground process 152. The application running as the foreground process 150 can have a graphical user interface 305 rendered within the display 148 of the client device 104. As depicted, the graphical user interface 305 can be for a web browser application running as the foreground process 150. In this context, the NLP component 116 of the digital assistant application 108 running on the client device 104 can receive an input audio signal via the microphone 146 of the client device 104. The NLP component 116 can apply automated speech recognition to identify one or more words 310 from the input audio signal. For example, the NLP component 116 can identify the words 310 "How many steps have I taken today?" from the input audio signal.

The NLP component 116 on the client device 104 or the data processing system 102 can perform further processing on the words 310. By further processing, the NLP component 116 can identify the request from the words 310 recognized from the input audio signal. In the example depicted, the NLP component 116 can identify the request as a fetch request for a number of steps taken by a user operating or otherwise associated with the client device 104. Using the identified request, the action handler component 120 can identify an agent application 110 capable of performing the request. The action handler component 120 can also select an action-inventory 140 from the data repository 128. The action-inventory 140 can be for the action corresponding to the request to be executed by the agent application 110. Using the action-inventory 140, the action handler component 120 can invoke the agent application 110 to carry out the action corresponding to the request.

In conjunction, the agent interface component 126 can identify that a user interface component 142 is to be displayed in carrying out the action of the action-inventory 140. The action-inventory 140 can specify whether a user interface component 142 is to be displayed, and can identify which user interface component 142 is to be presented. In response to the identification, the agent interface component 126 can determine whether concurrent presentation is permitted with the graphical user interface component 305 of the foreground application. The determination can be in accordance with an authorization policy for the agent application 110. The authorization policy for the agent application 110 can specify which applications are allowed to be concurrently presented with the user interface component 142 of the agent application 110. In the example depicted, the agent interface component 126 can determine that concurrent presentation is permitted.

In response to the determination, the agent interface component 126 can identify the user interface component 142 from the action-inventory 140 for carrying out the action indicated by the words 310. Upon identification, the agent interface component 126 can render the user interface component 142 as an overlay component 315 superimposed on top of the graphical user interface 305 of the foreground process 150. In the example depicted, the user interface component 142 rendered as the overlay component 315 can include the words 310 of the request corresponding to the action, "How many steps?" In addition, the user interface component 142 can also have the resultant output from carrying out the action, "You have taken 3147 steps today." The user interface component 142 rendered as the overlay component 315 can also include a command button 320. Upon interaction with the command button 320, the agent interface component 125 can close the overlay component 315, causing the user interface component 142 to disappear from the rendering on the display 148 of the client device 104.

Figure 4:
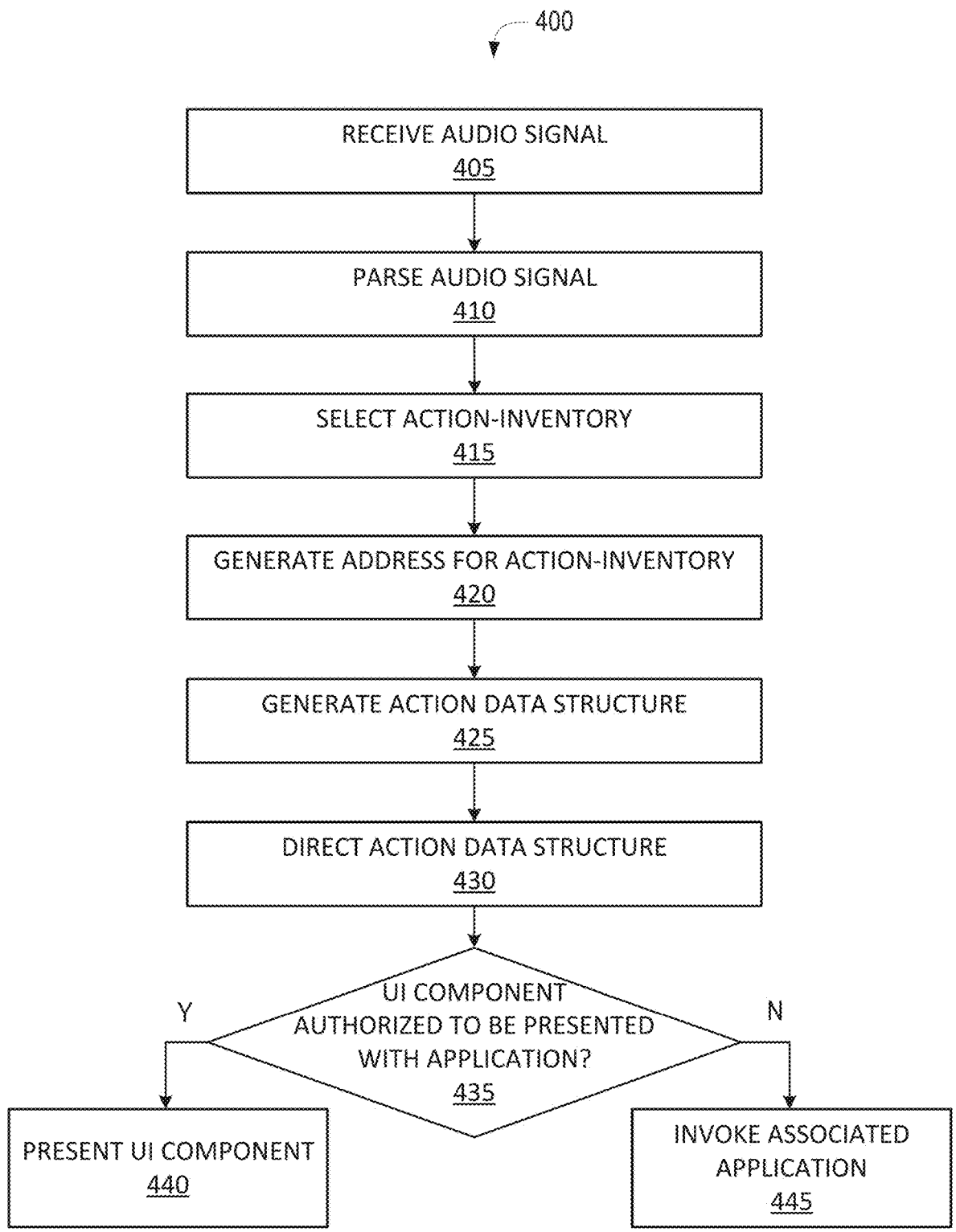
FIG. 4 illustrates a flow diagram of a method to render visual components on applications in response to voice input commands using the example system illustrated in FIG. 1, in accordance with an example of the present disclosure.

FIG. 4 illustrates a block diagram of an example method 400 of rendering visual components on applications. The method 400 can be implemented or executed by the system 100 described above in conjunction with FIGS. 1-3 or system 500 detailed below in conjunction with FIG. 5. In brief overview, the NLP component 116 can receive an input audio signal (405). The NLP component 116 can parse the input audio signal (410). The action handler component 120 can select an action-inventory 140 (415). The action handler component 120 can generate an address using the action-inventory 140 (420). The action handler component 120 can generate an action data structure (425). The agent interface component 126 can direct the action data structure (430). The agent interface component 126 can determine whether a user interface component 142 is authorized to be presented with a foreground application (435). If determined to be authorized, the agent interface component 126 can present the user interface component 142 (440). If determined to be not authorized, the agent interface component 126 can invoke an agent application 110 associated with the user interface component (445).

In further detail, the NLP component 116 can receive an input audio signal (405). The NLP component 116 can receive one or more data packets including the input audio signal acquired at a sensor (e.g., the microphone 146) on the client device 104. For example, the NLP component 116 of the digital assistant application 108 executed at least partially by the data processing system 102 can receive the input audio signal. The input audio signal can include a conversation facilitated by the digital assistant application 108. The conversation can include one or more inputs and outputs. The conversation can be audio based, text based, or a combination of audio and text. The input audio signal can include text input, or other types of input that can provide conversational information. When the input audio signal is received, the client device 104 can have applications running as the foreground process 150 and the non-foreground process 152.

The NLP component 116 can parse the input audio signal (410). By parsing the input audio signal, the NLP component 116 can identify a request and one or more parameters using various natural language processing techniques. The request can be an intent or request that can be fulfilled by the digital assistant application 108 or the agent application 110. The parameters can define the request. Based on the request, the NLP component 116 can determine that the request corresponds to one of the functions of the agent application 110.

The action handler component 120 can select an action-inventory 140 (415). Based on the request identified from the input audio signal, the action handler component 120 can select the action-inventory 140 from the set maintained on the data repository 128. For each action-inventory 140, the action handler component 120 can compare the request with the request identifier of the action-inventory 140. The comparison can be performed using a semantic knowledge graph. From the comparison, the action handler component 120 can determine that the request matches the request identifier of the action-inventory 140. In response to the determination, the action handler component 120 can select the action-inventory 140 from the set maintained on the data repository 128. The selected action-inventory can indicate that the user interface component 142 of the agent application 110 that is not running as the foreground process 150 is to be presented.

The action handler component 120 can generate an address using the action-inventory 140 (420). The generation of the address can be in accordance with an address template of the action-inventory 140. The address template can have a first portion and a second portion. The first portion can reference the agent application 110 or the agent service 106 for the agent application 110 to carry out the action. The second portion can reference the action and can include one or more input variables for the action. The action handler component 120 can take the first portion and the second portion from the address template in generating the address. The action handler component 120 can insert or populate the parameters into the input variables of the second portion of the address template.

The action handler component 120 can generate an action data structure (425). The action data structure can include a header and a body. The action handler component 120 can insert the address generated in accordance with the address template of the action-inventory 140 into the header of the action data structure. The action handler component 120 can set the address as a destination address of the header to route the action data structure to the agent application 110 or the agent service 106 for the agent application 110.

The agent interface component 126 can direct the action data structure (430). The agent interface component 126 can direct the action data structure to the agent application 110. The agent interface component 126 can invoke the agent application 110 using the action data structure and can pass the action data structure to the agent application 110. The agent application 110 in turn can parse the action data structure to identify the action and one or more parameters form the address included in the action data structure. The agent application 110 can execute the action in accordance with the parameters.

The agent interface component 126 can determine whether a user interface component 142 is authorized to be presented with a foreground application (435). The determination of whether the user interface component 142 is authorized can be in accordance with an authorization policy. The authorization policy can specify whether the output of the agent application 110 is permitted or restricted from concurrent presentation with the graphical user interface of the application running as the foreground process 150. The agent interface component 126 can identify the application running in the foreground process 150. The agent interface component 126 can compare the application with the specifications of the authorization policy. When the authorization policy permits concurrent presentation, the agent interface component 126 can determine that the user interface component 142 is authorized to be presented. Otherwise, when the authorization policy restricts the concurrent presentation, the agent interface component 126 can determine that the user interface component 142 is not authorized to be presented with the application running as the foreground process 150.

If determined to be authorized, the agent interface component 126 can present the user interface component 142 (440). The agent interface component 126 can identify the user interface component 142 from the selected action-inventory 140 (e.g., using an address include therein). The agent interface component 126 can render the identified user interface component 142 as an overlay on the graphical user interface of the application running in the foreground process 150. The agent interface component 126 can include the request for the action and the output generated by the agent application 110 in the user interface component 142.

On the other hand, if determined to be not authorized, the agent interface component 126 can invoke an agent application 110 associated with the user interface component 142 (445). The agent interface component 126 can remove the original application running from the foreground process 150 and set the application to the non-foreground process 152, thereby removing the rendering of the graphical user interface of the application. The agent interface component 126 can set with the agent application 110 as the foreground process 150. The agent interface component 126 can also render the graphical user interface of the agent application 110 on the display 148 of the client device.

Figure 5:
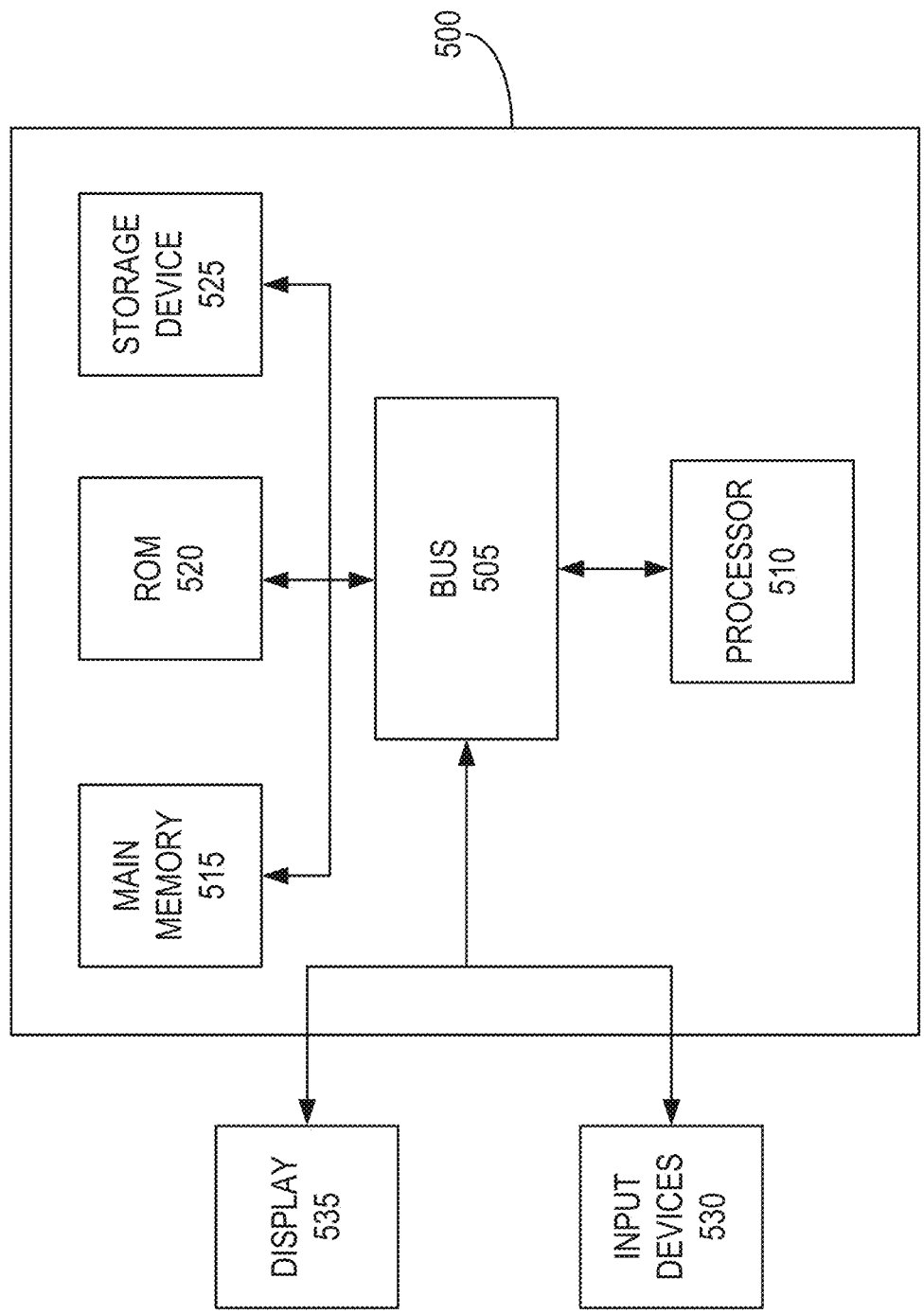
FIG. 5 is a block diagram of an example computer system.

FIG. 5 is a block diagram of an example computer system 500. The computer system or computing device 500 can include or be used to implement the system 100 or its components such as the data processing system 102. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information and instructions to be executed by the processor 510. The main memory 515 can be or include the data repository 128. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repositories 128.

The computing system 500 may be coupled via the bus 505 to a display 535, such as a liquid crystal display or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client devices 104, or other components of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 114). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104 or the agent service 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 116, the audio signal generator component 118, the action handler component 120, the response selector component 122, the agent registry component 124, and the agent interface component 126 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to render visual components on applications, comprising:
    a natural language processor executed on a data processing system having one or more processors, the natural language processor to:
        receive a data packet comprising an input audio signal detected by a sensor of a client device, the client device displaying a graphical user interface of a first application in a foreground process on the client device; and
        parse the input audio signal of the data packet to identify a request;
    an action handler executed on the data processing system to:
        select an action-inventory that executes an action corresponding to the request by a second application, the second application installed on the client device and not in the foreground process; and
        generate an action data structure in accordance with the action-inventory; and
    an agent interface executed on the data processing system to:
        provide the action data structure to the second application to cause the second application to parse the action data structure and execute the action to generate an output;
        determine that the output of the second application from execution of the action is authorized to be presented with the graphical user interface of the first application based on an authorization policy of the second application;
        identify the user interface component of the second application for the action-inventory, responsive to the determination the output of the second application is authorized to be presented with the first application; and
        display, on the client device, the user interface component including the output from the second application with the graphical user interface of the first application authorized to be presented with the second application.

2. The system of claim 1, comprising:
    the action-inventory having an agent identifier corresponding to the second application and a request identifier corresponding to the action;
    the natural language processor to parse the input audio signal of the data packet to identify an agent identifier corresponding to an agent, the agent corresponding to the second application installed on the client device; and
    the action handler to select the action-inventory for executing the action having the agent identifier corresponding to the agent identifier identified from parsing the input audio signal.

3. The system of claim 1, comprising the action handler to:
    determine that the interface mode indicator of the action-inventory specifies rendering of the user interface component in executing the action; and
    identify the user interface component of the second application for the action-inventory, responsive to the determination that the interface mode indicator specifies rendering of the user interface component.

4. The system of claim 1, comprising the agent interface to:
    determine that the client device is not authenticated with the second application for the action-inventory to carry out the action corresponding to a second request; and
    present, responsive to the determination that the client device is not authenticated with the second application, a prompt interface on the client device to authenticate the client device with the second application to execute the action corresponding to the second request.

5. The system of claim 1, comprising the agent interface to provide the action data structure to the second application to cause the second application to:
    monitor for an interaction event on the user interface component from the second application presented with the graphical user interface of the first application; and process, responsive to detection of the interaction event, the interaction event to update the user interface component.

6. The system of claim 1, comprising:

the natural language processor to receive the data packet via a digital assistant application, the data packet comprising the input audio signal detected by the sensor of the client device, the client device displaying the graphical user interface of the digital assistant application corresponding to the first application in the foreground process; and the agent interface to display, within the graphical user interface of the digital assistant application, the user interface component including a subcomponent indicating the request identified from parsing the input audio signal and the user interface component including the output from an agent corresponding to the second application.

7. The system of claim 1, comprising:

the natural language processor to receive the data packet, the data packet comprising the input audio signal detected by the sensor of the client device, the client device displaying the graphical user interface of a first agent corresponding to the first application in the foreground process; and the agent interface to display the user interface component including the output from the second application as an overlay on the graphical user interface of the first agent.

8. The system of claim 1, comprising the action handler to provide the action data structure to the second application to cause the second application to:

parse the action data structure to identify the action to be executed;

generate the output by executing the action identified from the action data structure; and provide the output for the user interface component to be presented with the graphical user interface of the first application authorized to be presented with the second application.

9. The system of claim 1, wherein the action data structure comprises an address to execute the action of the action-inventory.

10. The system of claim 9, wherein the address comprises a first substring corresponding to the second application.

11. The system of claim 10, wherein the address comprises a second substring corresponding to the action.

12. The system of claim 11, wherein the second substring comprises at least one input variable used to execute the action.

13. A method of rendering visual components on applications, comprising:

receiving, by a data processing system having one or more processors, a data packet comprising an input audio signal detected by a sensor of a client device, the client device displaying a graphical user interface of a first application in a foreground process on the client device;

parsing, by the data processing system, the input audio signal of the data packet to identify a request;

selecting, by the data processing system an action-inventory that executes an action corresponding to the request by a second application, the second application installed on the client device and not the foreground process;

generating, by the data processing system, an action data structure in accordance with the action-inventory;

providing, by the data processing system, the action data structure to the second application to cause the second application to parse the action data structure and execute the action to generate an output;

determining, by the data processing system, that the output of the second application from execution of the action is authorized to be presented with the graphical user interface of the first application based on an authorization policy of the second application;

identifying, by the data processing system, the user interface component of the second application for the action-inventory, responsive to the determination the output of the second application is authorized to be presented with the first application; and displaying, by the data processing system, on the client device, the user interface component including the output from the second application with the graphical user interface of the first application authorized to be presented with the second application.

14. The method of claim 13, comprising:

determining, by the data processing system, that the client device is not authenticated with the second application for the action-inventory to carry out the action corresponding to a second request; and presenting, by the data processing system, responsive to the determination that the client device is not authenticated with the second application, a prompt interface on the client device to authenticate the client device with the second application to execute the action corresponding to the second request.

15. The method of claim 13, comprising:

receiving, by the data processing system, the data packet via a digital assistant application, the data packet comprising the input audio signal detected by the sensor of the client device, the client device displaying the graphical user interface of the digital assistant application corresponding to the first application in the foreground process; and displaying, by the data processing system, within the graphical user interface of the digital assistant application, the user interface component including a subcomponent indicating the request identified from parsing the input audio signal and the user interface component including the output from an agent corresponding to the second application.

16. The method of claim 13, comprising providing, by the data processing system, the action data structure to the second application to cause the second application to:

monitor for an interaction event on the user interface component from the second application presented with the graphical user interface of the first application; and process, responsive to detection of the interaction event, the interaction event to update the user interface component.

17. The method of claim 13, wherein the action data structure comprises an address to execute the action of the action-inventory.

18. The method of claim 17, wherein the address comprises a first substring corresponding to the second application.

19. The method of claim 18, wherein the address comprises a second substring corresponding to the action.

20. The method of claim 19, wherein the second substring comprises at least one input variable used to execute the action.

* * * * *